US011244039B2

(12) United States Patent
Watanabe

(10) Patent No.: US 11,244,039 B2
(45) Date of Patent: Feb. 8, 2022

(54) DETERMINATION METHOD, AUTHENTICATION APPARATUS, AND STORAGE MEDIUM

(71) Applicant: FUJITSU LIMITED, Kawasaki (JP)

(72) Inventor: Naotoshi Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 324 days.

(21) Appl. No.: 16/247,985

(22) Filed: Jan. 15, 2019

(65) Prior Publication Data
US 2019/0220586 A1 Jul. 18, 2019

(30) Foreign Application Priority Data
Jan. 18, 2018 (JP) .............................. JP2018-006223

(51) Int. Cl.
G06F 21/56 (2013.01)
H04L 29/06 (2006.01)
G06F 21/12 (2013.01)
G06F 21/44 (2013.01)
G06F 21/45 (2013.01)

(52) U.S. Cl.
CPC ............ *G06F 21/44* (2013.01); *G06F 21/125* (2013.01); *G06F 21/45* (2013.01); *G06F 21/561* (2013.01); *G06F 21/564* (2013.01); *G06F 21/566* (2013.01); *H04L 63/1441* (2013.01)

(58) Field of Classification Search
CPC ...... G06F 21/44; G06F 21/566; G06F 21/561; G06F 21/45; G06F 21/125; G06F 21/564; H04L 63/1441; H04L 63/12; H04L 63/08; H04L 63/145
See application file for complete search history.

(56) References Cited

U.S. PATENT DOCUMENTS

| | | | | |
|---|---|---|---|---|
| 9,342,683 B2 * | 5/2016 | Weiss | ...................... | G06F 21/44 |
| 9,916,442 B2 * | 3/2018 | Lindo | ................... | G06F 21/552 |
| 10,594,675 B2 * | 3/2020 | Yoshii | ................... | H04L 63/083 |
| 2009/0077645 A1 * | 3/2009 | Kottahachchi | .......... | G06F 21/33 |
| | | | | 726/9 |
| 2009/0164377 A1 * | 6/2009 | Aissi | ...................... | G06Q 10/02 |
| | | | | 705/50 |
| 2011/0067100 A1 * | 3/2011 | Fukuoh | ................... | G03G 15/55 |
| | | | | 726/21 |
| 2014/0150100 A1 * | 5/2014 | Gupta | ................... | G06F 21/316 |
| | | | | 726/22 |

(Continued)

FOREIGN PATENT DOCUMENTS

JP 2016-518633 6/2016
WO 2014/116977 7/2014

*Primary Examiner* — Vu V Tran
(74) *Attorney, Agent, or Firm* — Fujitsu Patent Center

(57) ABSTRACT

A determination method executed by a computer that serves as an authentication apparatus for a program that operates on a device, the determination method includes counting a number of times of execution of a first process related to the device and determining, in a case where an authentication request for the program that includes a number of times of execution of a second process in the device is received, whether or not it is required to verify the device based on a result of comparison between the number of times of execution of the first process and the number of times of execution of the second process.

6 Claims, 25 Drawing Sheets

(56) References Cited

U.S. PATENT DOCUMENTS

| | | | |
|---|---|---|---|
| 2014/0259138 A1* | 9/2014 | Fu | G06F 21/32 |
| | | | 726/7 |
| 2017/0220791 A1* | 8/2017 | Shibutani | H04W 12/068 |
| 2019/0114417 A1* | 4/2019 | Subbarayan | G06N 20/00 |

* cited by examiner

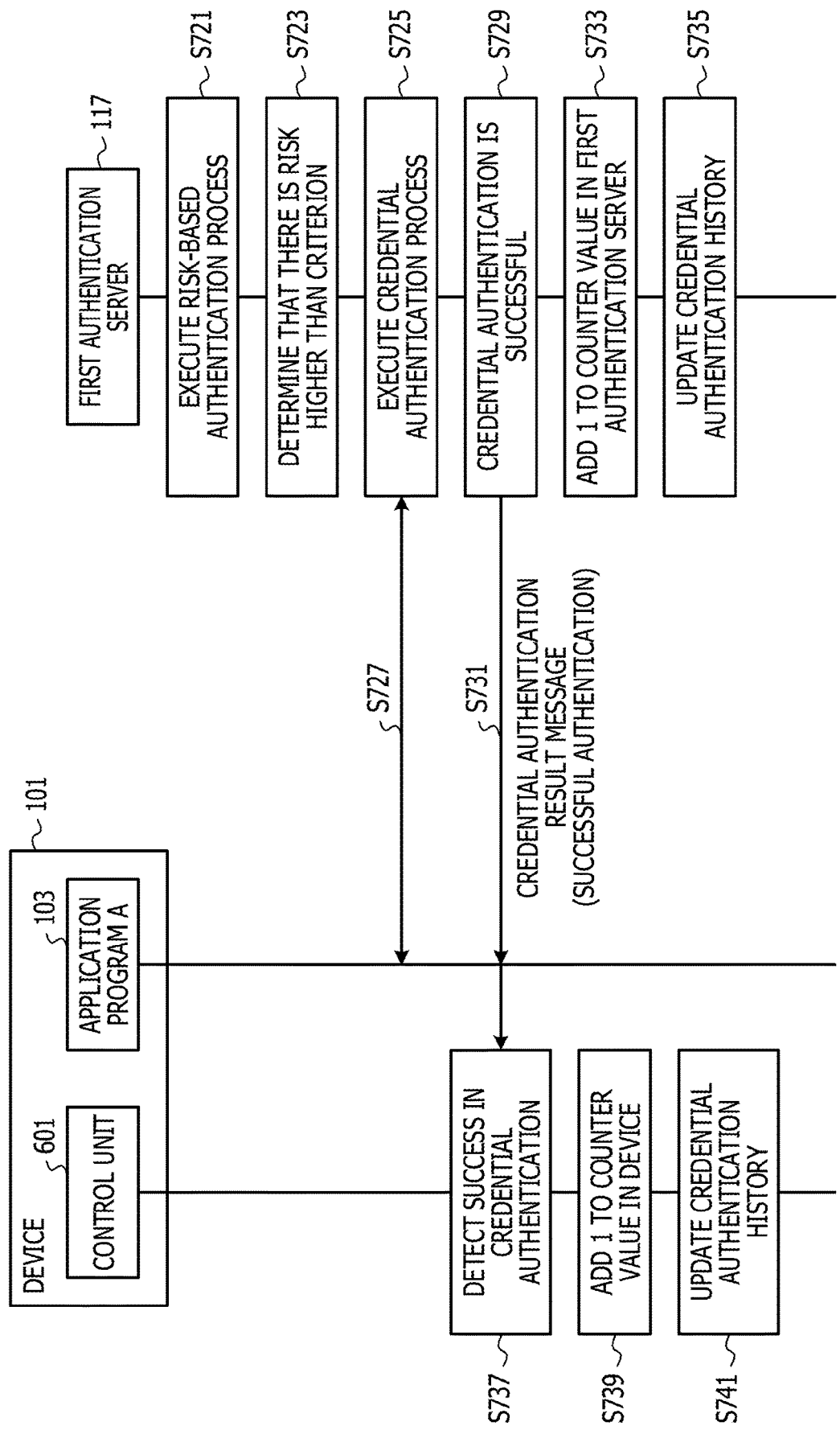

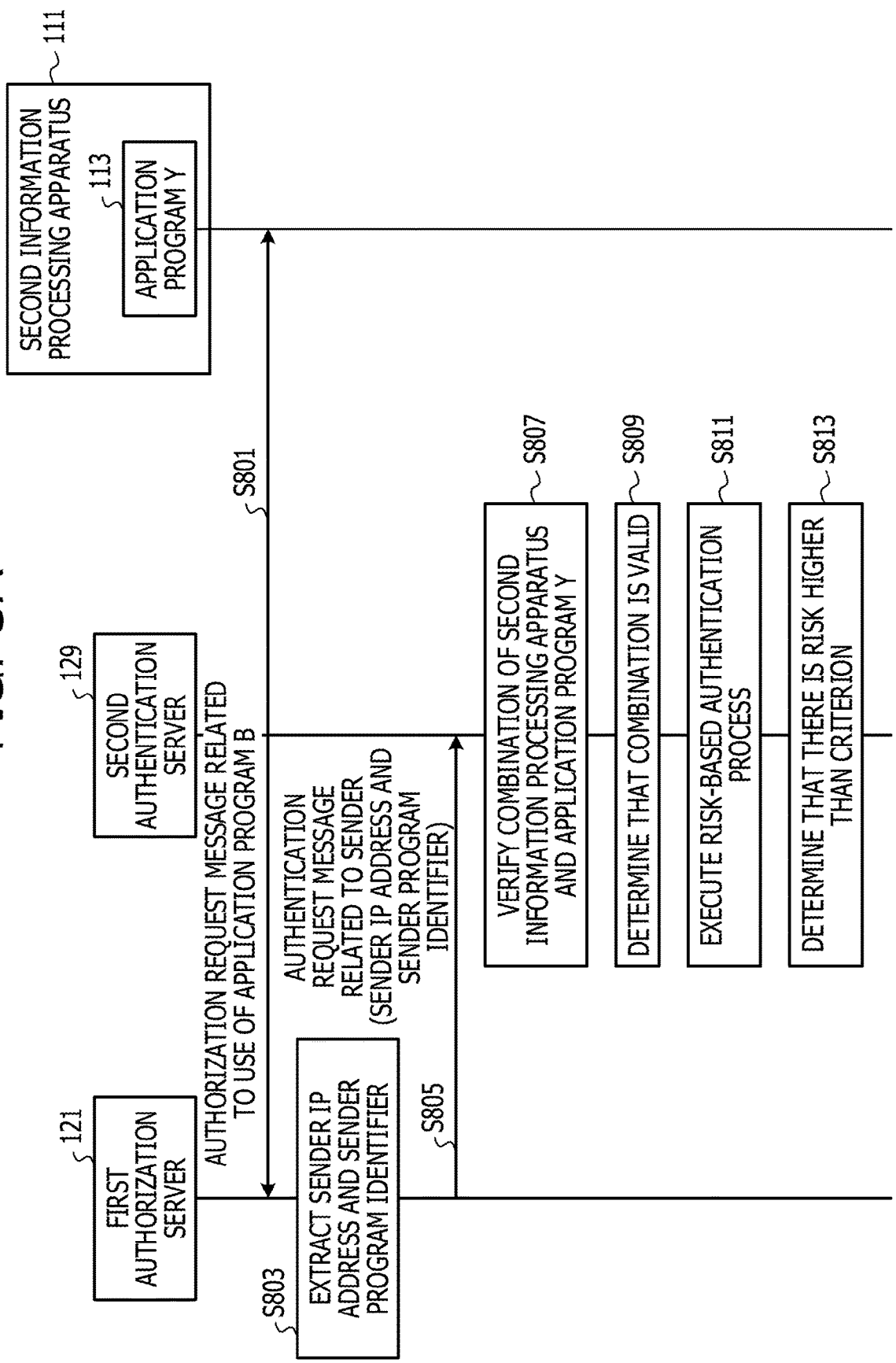

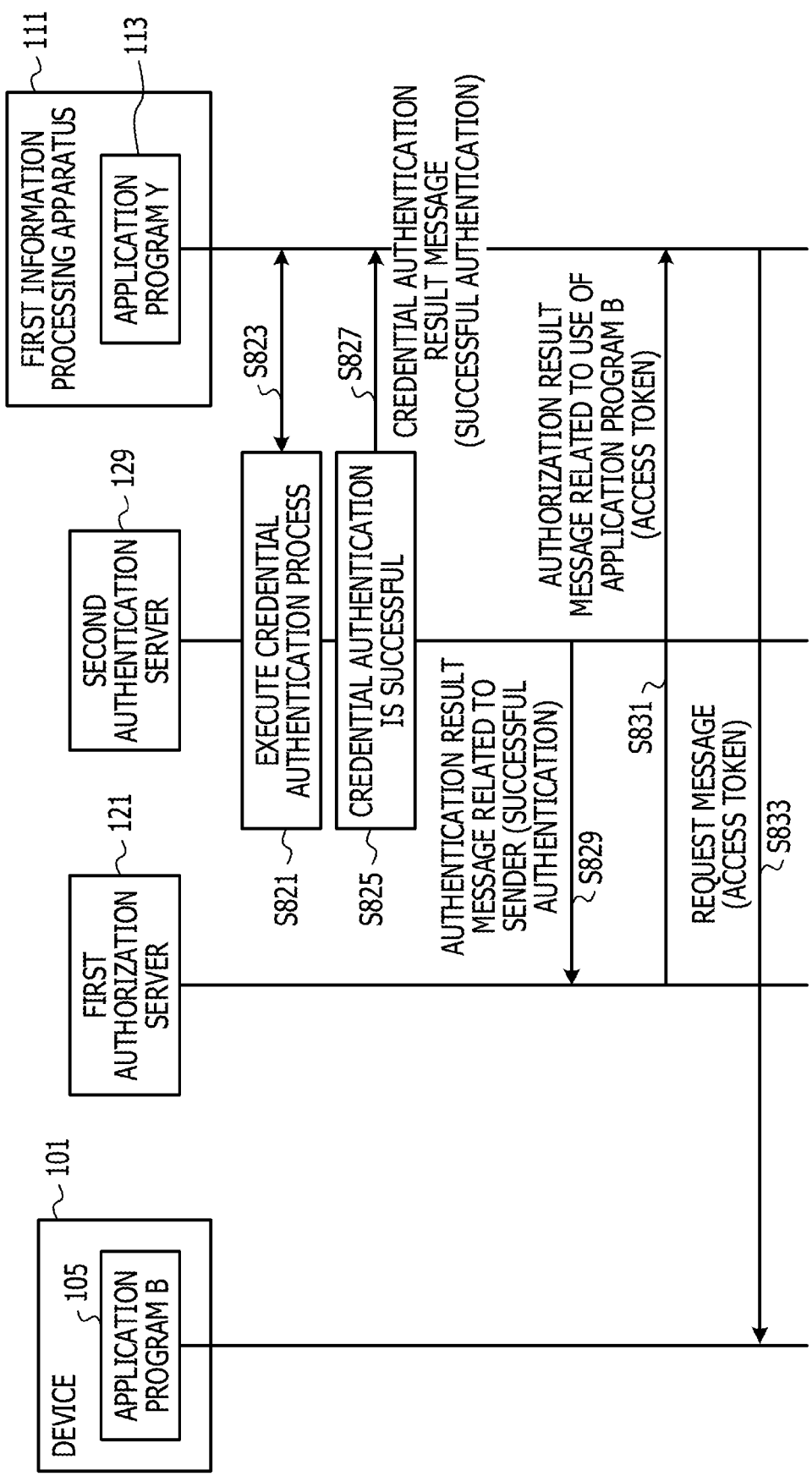

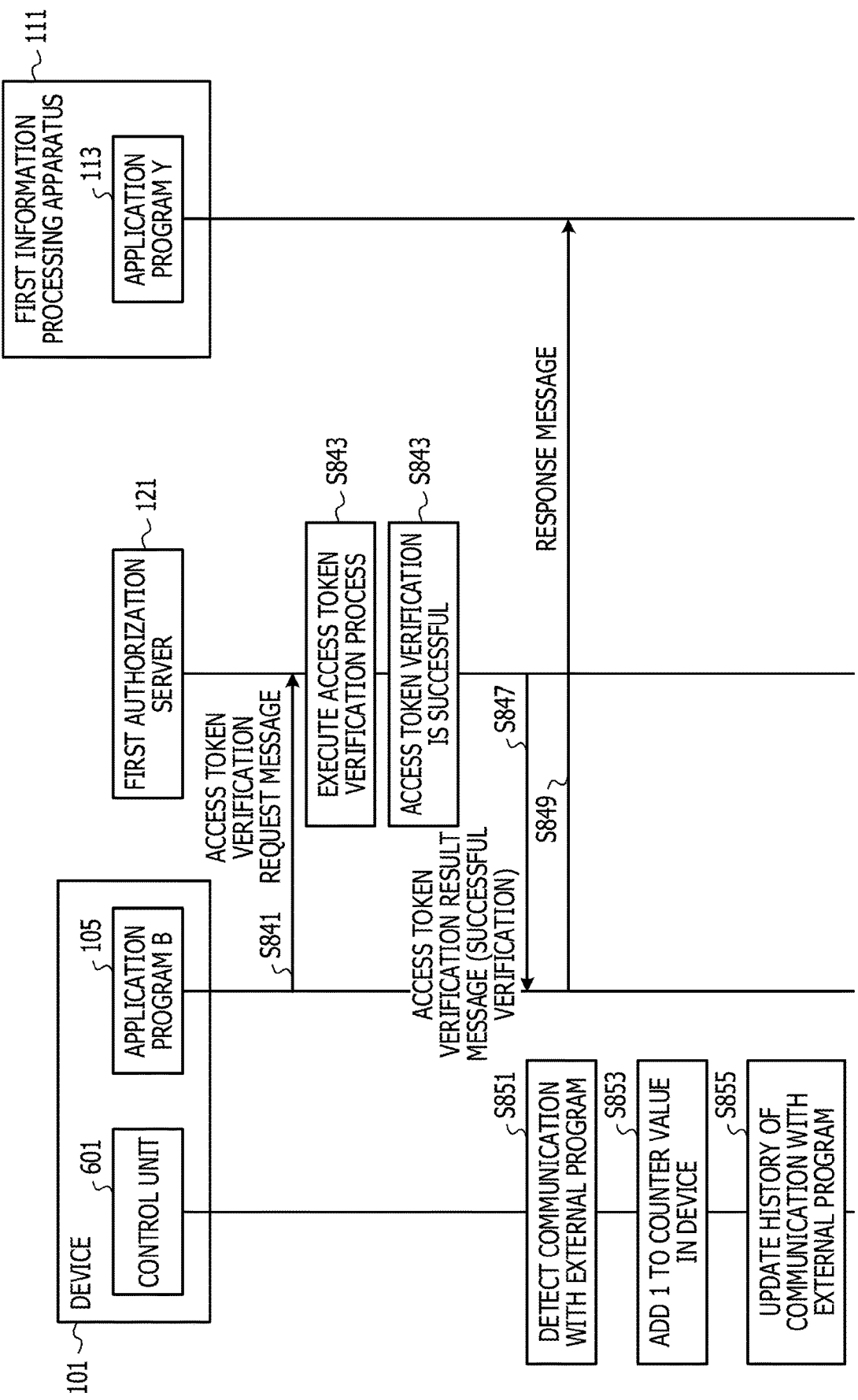

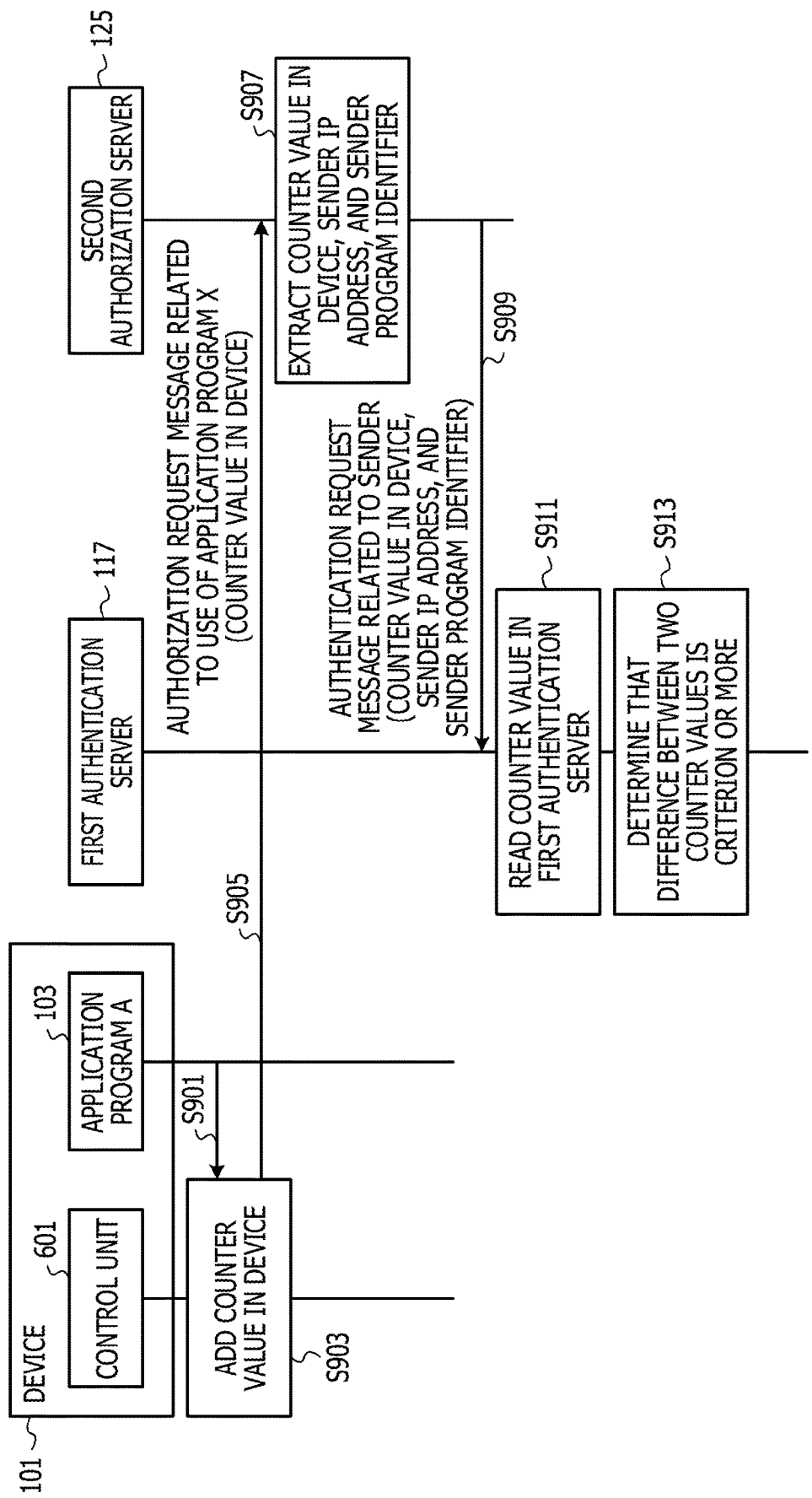

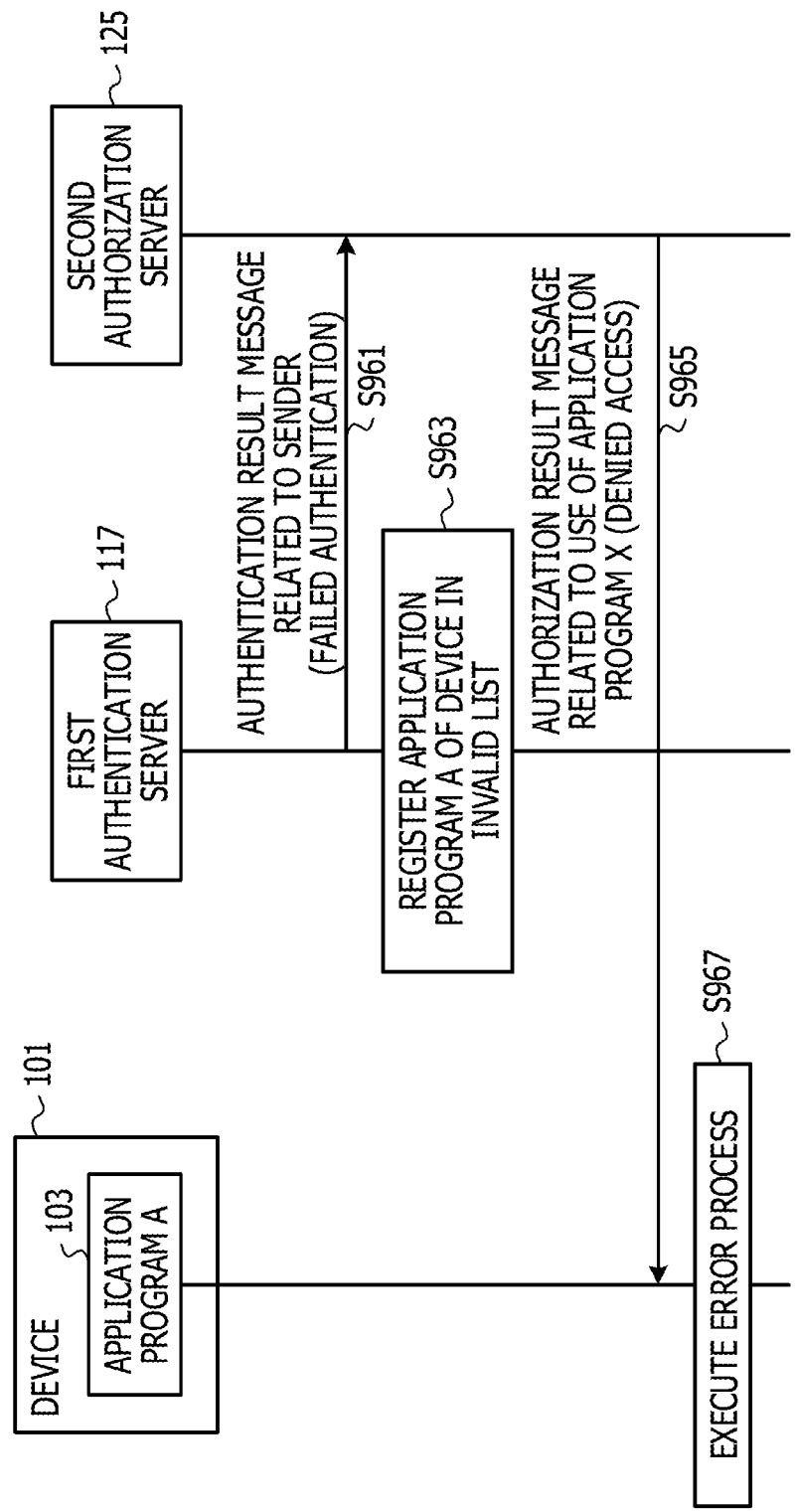

DETERMINATION METHOD, AUTHENTICATION APPARATUS, AND STORAGE MEDIUM

CROSS-REFERENCE TO RELATED APPLICATION

This application is based upon and claims the benefit of priority of the prior Japanese Patent Application No. 2018-6223, filed on Jan. 18, 2018, the entire contents of which are incorporated herein by reference.

FIELD

The embodiment discussed herein is related to a technique of estimating a risk with an apparatus to be authenticated by an authentication apparatus.

BACKGROUND

An authentication server that authenticates a program that operates on a device is occasionally used in order to ensure the security of communication with the device. When the authentication server performs credential authentication on the program which operates on the device, spoofing for the program may be suppressed.

Once the program which operates on the device is infected with a virus, however, a fraudulent communication process may not be suppressed by the credential authentication by the authentication server. If the device which is infected with the virus communicates with the outside, the virus may be spread. Japanese National Publication of International Patent Application No. 2016-518633, for example, is disclosed as the related art.

In view of the above, it is desirable to estimate a risk with a device to be authenticated.

SUMMARY

According to an aspect of the embodiments, A determination method executed by a computer that serves as an authentication apparatus for a program that operates on a device, the determination method includes counting a number of times of execution of a first process related to the device and determining, in a case where an authentication request for the program that includes a number of times of execution of a second process in the device is received, whether or not it is required to verify the device based on a result of comparison between the number of times of execution of the first process and the number of times of execution of the second process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7B illustrates an example of the sequence in the first access phase;
FIG. 8A illustrates an example of the sequence in a second access phase;
FIG. 8B illustrates an example of the sequence in the second access phase;
FIG. 8C illustrates an example of the sequence in the second access phase;
FIG. 9A illustrates an example of the sequence in a third access phase;
FIG. 9D illustrates an example of the sequence in the third access phase.

DESCRIPTION OF EMBODIMENTS

Figure 1:
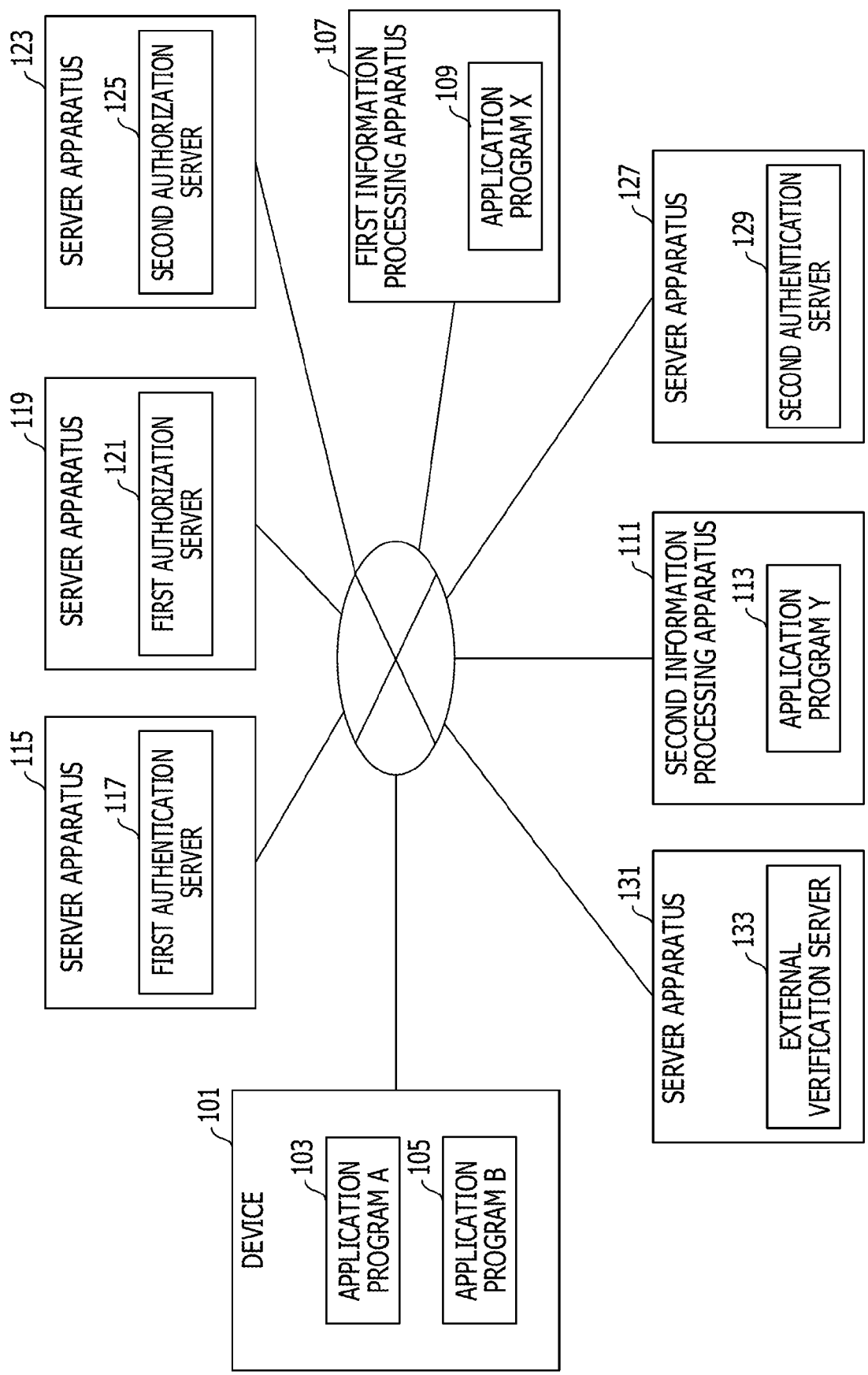
FIG. 1 illustrates an example of a network configuration.

FIG. 1 illustrates an example of a network configuration. A device 101 includes an application program A_103 and an application program B_105. The device 101 is occasionally connected to a network. The network is one or a combination of a plurality of a local area network (LAN), a mobile communication network, and the Internet, for example.

A first information processing apparatus 107 includes an application program X_109. The first information processing apparatus 107 is connected to the network. A second information processing apparatus 111 includes an application program Y_113. The second information processing apparatus 111 is connected to the network. A server apparatus 115 includes a first authentication server 117. The server apparatus 115 is connected to the network. A server apparatus 119 includes a first authorization server 121. The server apparatus 119 is connected to the network. A server apparatus 123 includes a second authorization server 125. The server apparatus 123 is connected to the network. A server apparatus 127 includes a second authentication server 129. The server apparatus 127 is connected to the network. A server apparatus 131 includes an external verification server 133. The server apparatus 131 is connected to the network.

The first authentication server 117 performs credential authentication on the application program A_103 and the application program B_105 which operate on the device 101 which is managed by the first authentication server 117. The first authorization server 121 authorizes access to the application program A_103 and the application program B_105 which operate on the device 101 which is managed by the first authorization server 121. The second authorization server 125 authorizes access to the application program X_109 which operates on the first information processing apparatus 107 which is managed by the second authorization server 125. The second authentication server 129 performs credential authentication on the application program Y_113 which operates on the second information processing apparatus 111 which is managed by the second authentication server 129.

The external verification server 133 verifies the device 101 based on history data and program configuration data on the device 101.

Figure 2:
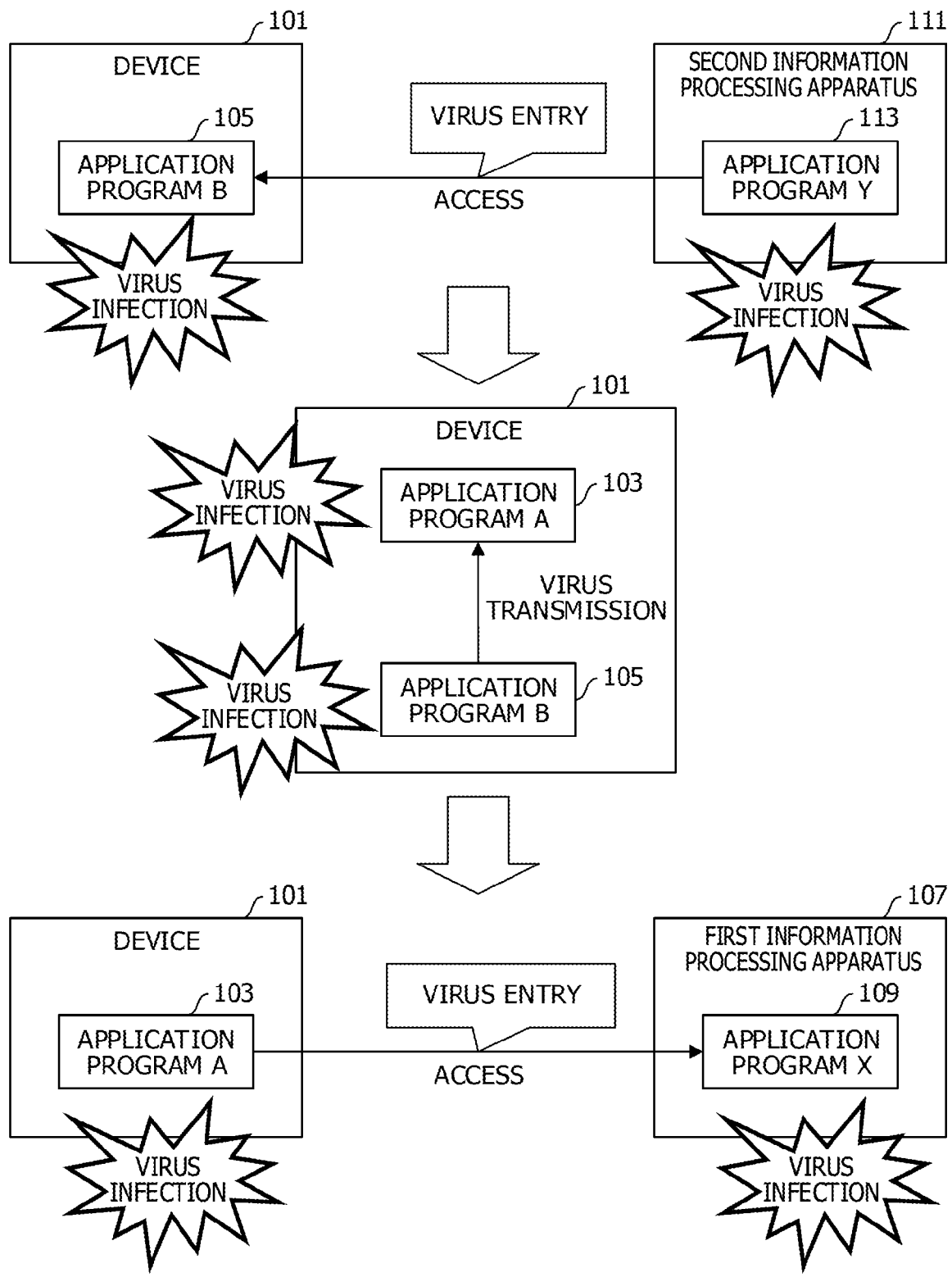
FIG. 2 illustrates an example of virus infection.

FIG. 2 illustrates an example of virus infection. As illustrated in the upper part, when the application program Y_113 which is infected with a virus accesses the application program B_105, the virus may enter the application program B_105.

After that, as illustrated in the middle part, the virus infecting the application program B_105 may be transmitted to the application program A_103.

As illustrated in the lower part, when the application program A_103 infected with the virus accesses the application program X_109, the virus further enters the application program X_109.

When the virus infecting the application program A_103 performs a fraudulent process of transmitting a credential (e.g. a set of an account name and a password or a certificate) to a spoofing program that fraudulently acts as the first authentication server 117, the credential of the application program A_103 leaks out. When the spoofing program is fraudulently authenticated, the number of times of authentication at the device 101 is increased.

The present embodiment makes it easy for the first authentication server 117 to determine a risk with the device 101, for example. In particular, the first authentication server 117 grasps an increase in the risk by placing focus on operation of the device 101 performed in accordance with a procedure that is irrelevant to the first authentication server 117.

Figure 3:
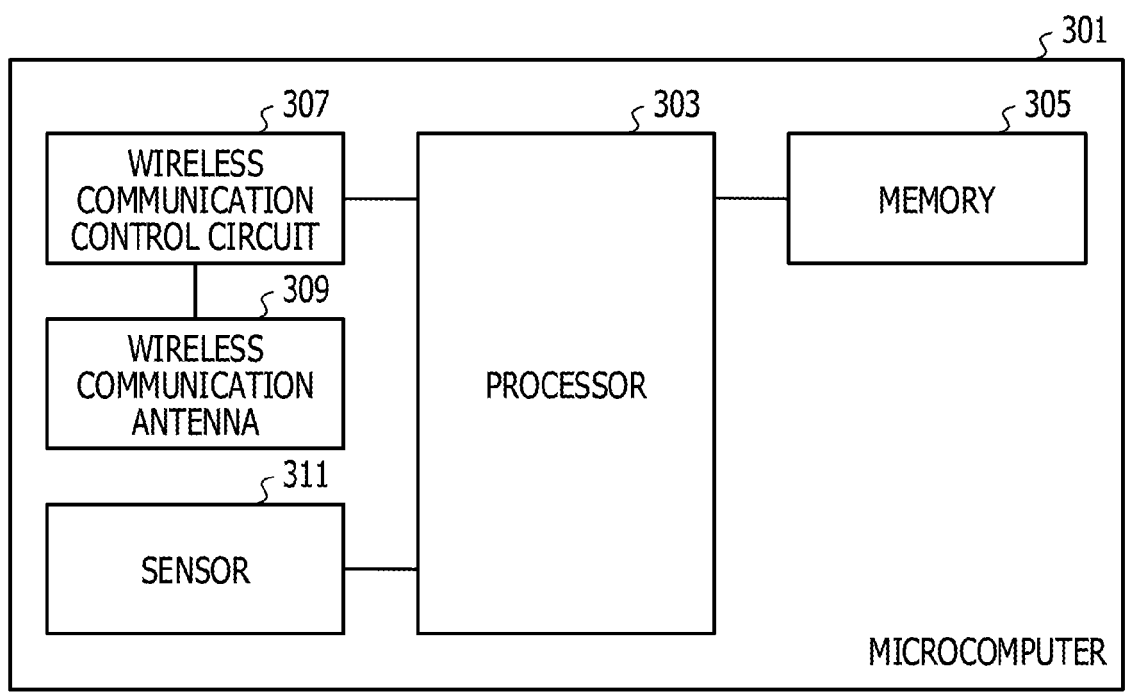
FIG. 3 illustrates an example of the hardware configuration of a microcomputer.

The device 101 is a microcomputer 301, for example. FIG. 3 illustrates an example of the hardware configuration of the microcomputer 301. The microcomputer 301 includes a processor 303, a memory 305, a wireless communication control circuit 307, a wireless communication antenna 309, and a sensor 311. The processor 303 executes a program stored in the memory 305. The memory 305 stores programs and data. The wireless communication control circuit 307 transmits and receives radio waves in accordance with a predetermined wireless communication scheme (e.g. a wireless LAN scheme or a cellular scheme). The wireless communication antenna 309 controls wireless communication performed in accordance with the scheme. The sensor 311 measures a temperature, a position, acceleration, or magnetism, for example.

Figure 4:
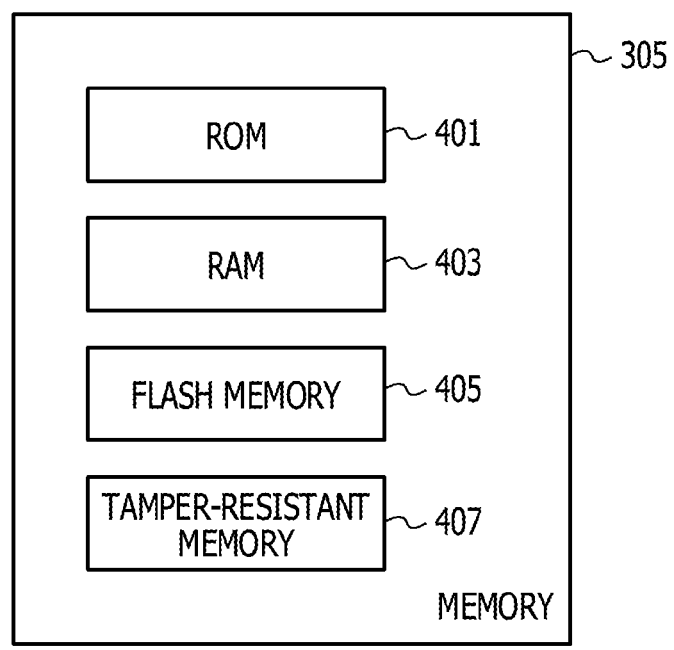
FIG. 4 illustrates an example of the configuration of a memory.

FIG. 4 illustrates an example of the configuration of the memory 305. In this example, the memory 305 includes a read only memory (ROM) 401, a random access memory (RAM) 403, a flash memory 405, and a tamper-resistant memory (407). The ROM 401 stores data and programs set in advance, for example. The RAM 403 includes a region for development of programs and data, for example. The flash memory 405 stores an operating system and application programs, for example. The tamper-resistant memory 407 has high tamper resistance.

Figure 18:
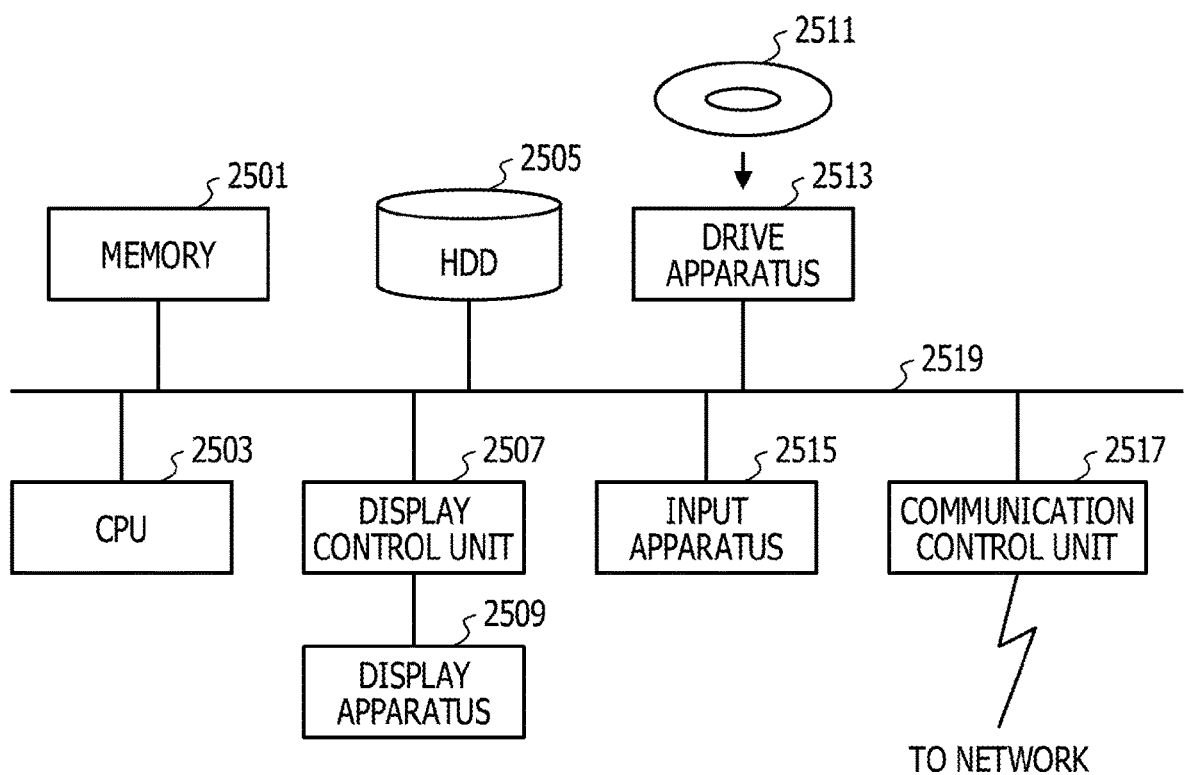
FIG. 18 is a functional block diagram of a computer.

The device 101 may be a computer apparatus illustrated in FIG. 18, for example. The device 101 may be a mobile phone terminal.

Figure 5:
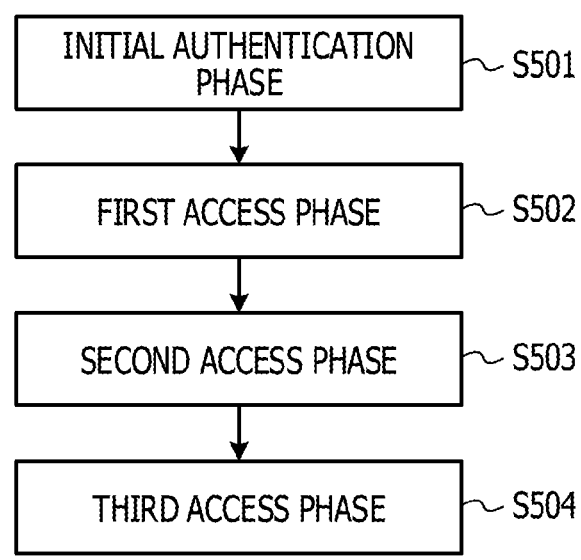
FIG. 5 illustrates an example of phases.

FIG. 5 illustrates an example of phases. An initial authentication phase (S501) corresponds to the time when the device 101 is started. The initial authentication phase (S501) will be discussed later with reference to FIG. 6. In a first access phase (S503), the application program A_103 accesses the application program X_109. The first access phase (S503) will be discussed later with reference to FIGS. 7A to 7C. In a second access phase (S505), the application program Y_113 accesses the application program B_105. The second access phase (S505) will be discussed later with reference to FIGS. 8A to 8C. In a third access phase (S507), the application program A_103 accesses the application program X_109 again. The third access phase (S507) will be discussed later with reference to FIGS. 9A to 9D.

Figure 6:
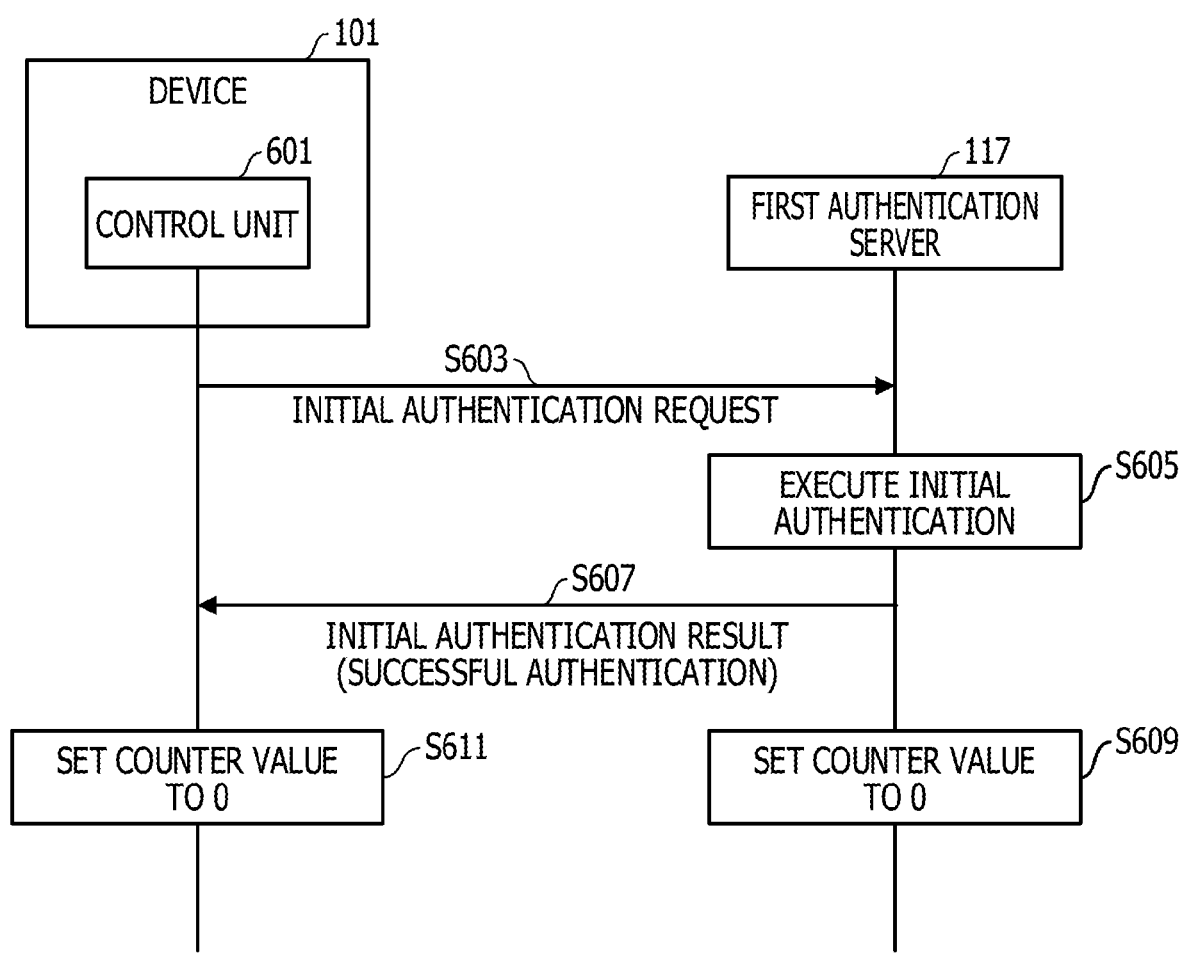
FIG. 6 illustrates an example of the sequence in an initial authentication phase.

FIG. 6 illustrates an example of the sequence in the initial authentication phase (S501). The device 101 includes a control unit 601. The control unit 601 performs control related to security.

When the device 101 is turned on to be started, the control unit 601 transmits an initial authentication request to the first authentication server 117 (S603).

The first authentication server 117 executes initial authentication (S605). The first authentication server 117 checks whether or not the device 101 is a valid device 101 in the initial authentication. When the initial authentication is successful, the first authentication server 117 transmits the initial authentication result which indicates successful authentication to the control unit 601 (S607). Then, the first authentication server 117 sets a counter value in the first authentication server 117 to 0 (S609). The counter value indicates the number of times of predetermined operation in the first authentication server 117. In this example, the predetermined operation in the first authentication server 117 is execution of credential authentication related to the device 101.

When the initial authentication result which indicates successful authentication is received, on the other hand, the control unit 601 sets a counter value in the device 101 to 0 (S611). The counter value indicates the number of times of predetermined operation in the device 101. In this example, the predetermined operation in the device 101 is operation to receive credential authentication and operation of communication performed with an external program in accordance with a procedure not via the first authentication server 117.

Figure 7A:
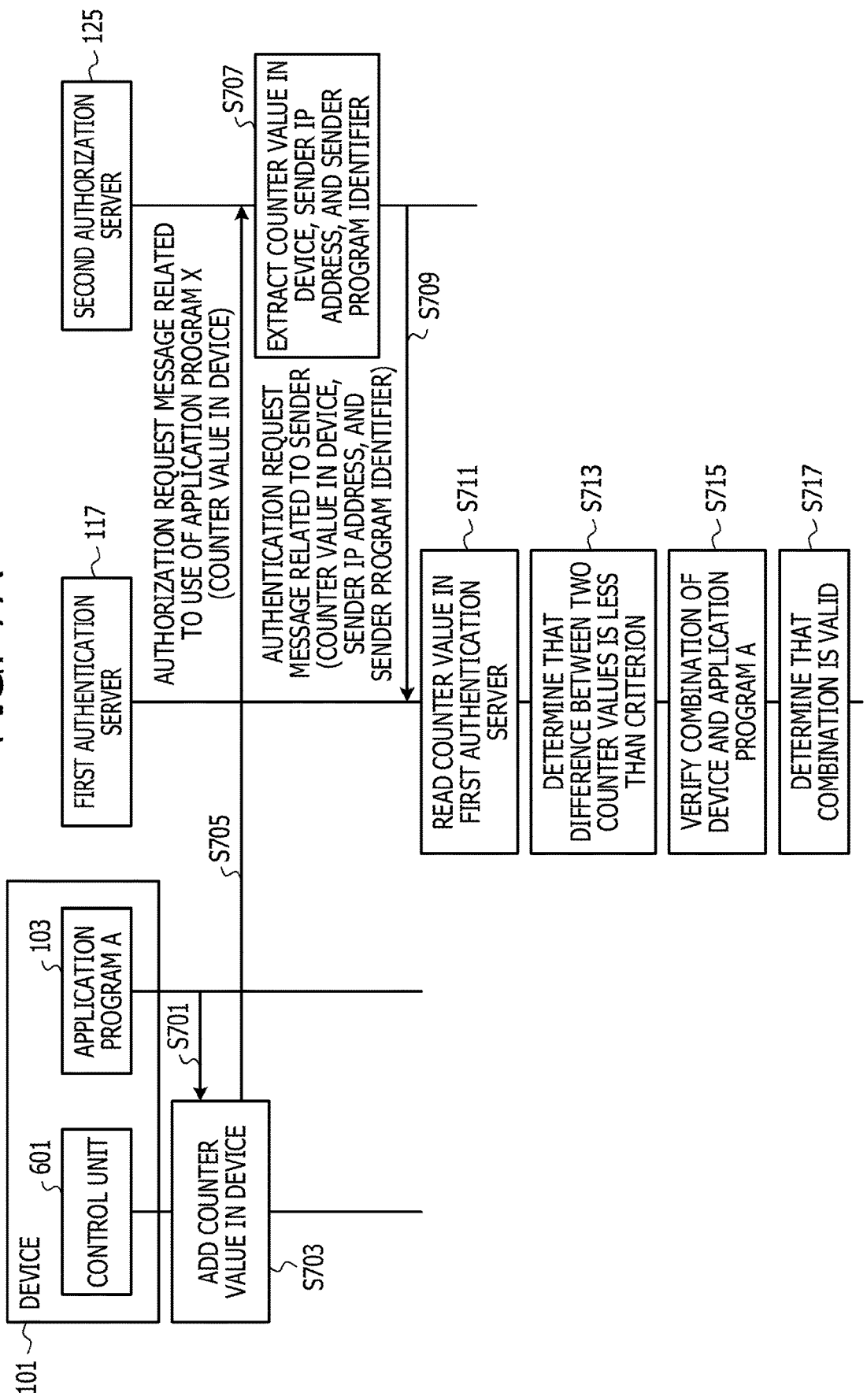
FIG. 7A illustrates an example of the sequence in a first access phase.
Figure 7C:
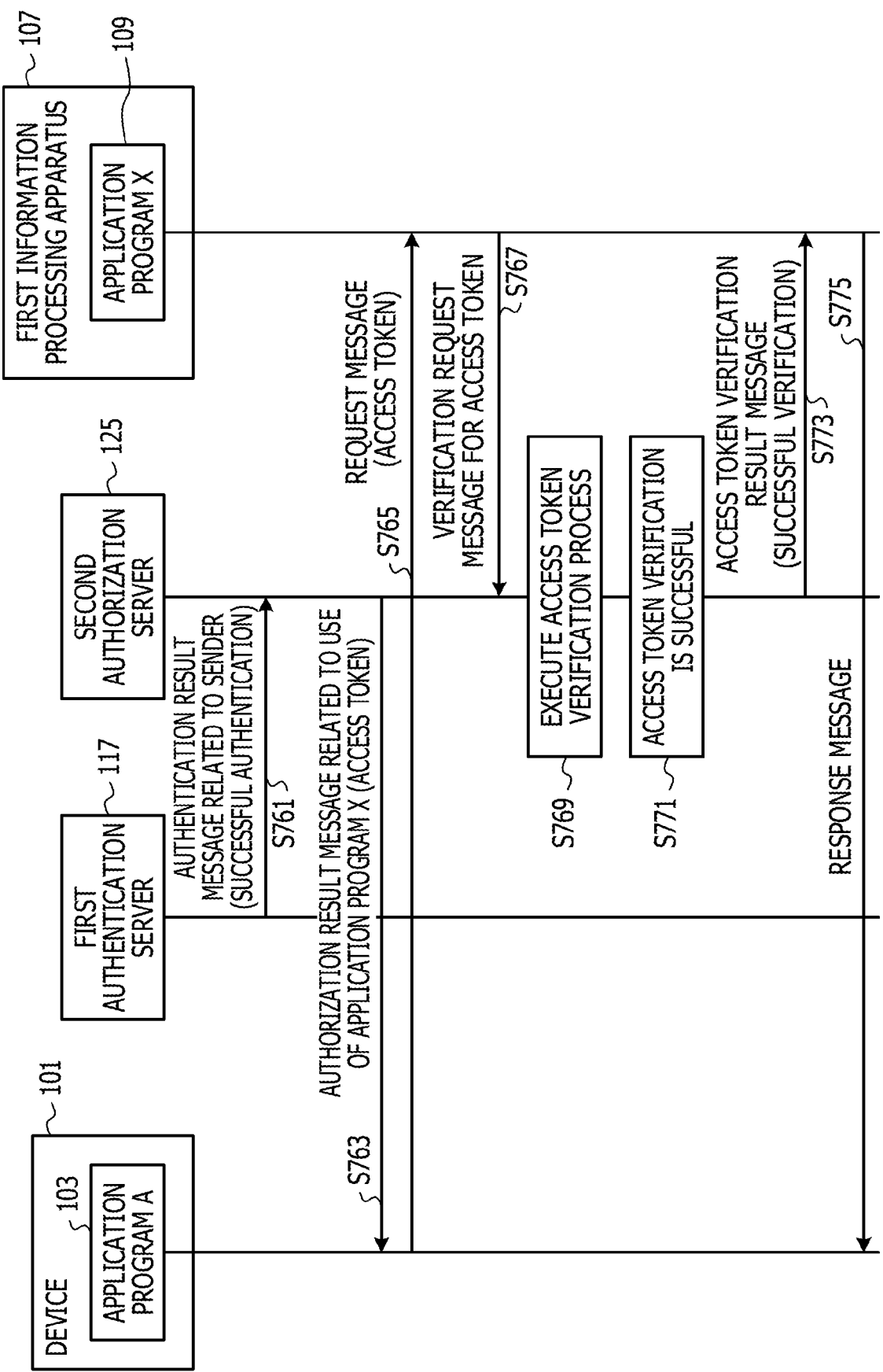
FIG. 7C illustrates an example of the sequence in the first access phase.

FIGS. 7A to 7C illustrate an example of the sequence in the first access phase (S503). The application program A_103 delivers an authorization request message to the control unit 601 at the stage when an authorization request message related to use of the application program X_109 is transmitted (S701). In this example, the destination of the authorization request message is the second authorization server 125. The destination of the authorization request message is occasionally set by redirecting.

When the authorization request message is received, the control unit 601 adds the counter value in the device 101 to the authorization request message (S703). Then, the control unit 601 transmits the authorization request message to which the counter value in the device 101 has been added to the network (S705).

When the authorization request message to which the counter value in the device 101 has been added is received, the second authorization server 125 extracts the counter value in the device 101, a sender IP (internet protocol) address, and a sender program identifier from the authorization request message (S707). In this example, the sender IP address is the IP address of the device 101. The sender program identifier is the name of the application program A_103. The sender IP address and the sender program identifier are set in the header of the authorization request message.

The second authorization server 125 transmits an authentication request message related to the sender to the first authentication server 117 (S709). The authentication request message includes the counter value in the device 101, the sender IP address, and the sender program identifier.

When the authentication request message is received, the first authentication server 117 reads the counter value which is stored in the first authentication server 117 (S711). The first authentication server 117 calculates the difference between the counter value in the device 101 and the counter value in the first authentication server 117. Specifically, the difference is calculated by subtracting the counter value in the first authentication server 117 from the counter value in the device 101. In the initial stage, both the two counter values are 0, and thus the difference is 0. In the present embodiment, in the case where the difference between the two counter values is less than a criterion, it is assumed that there is a low risk with the device 101.

If it is determined that the difference between the two counter values is less than the criterion (S713), the first authentication server 117 verifies the combination of the device 101 and the application program A_103 (S715). In the case where the combination of the device 101 and the application program A_103 is managed by the first authentication server 117, it is determined that the combination is valid (S717). The process proceeds to the sequence illustrated in FIG. 7B.

The sequence in FIG. 7B will be described. The first authentication server 117 executes a risk-based authentication process (S721). In the risk-based authentication process, the degree of a risk determined based on the identity of the communication partner and the time band and the frequency of communication, for example, is specified.

In the case where it is determined that there is a risk that is higher than a criterion (S723), the first authentication server 117 executes a credential authentication process (S725). At this time, the first authentication server 117 obtains a credential from the application program A_103 (S727). In the credential authentication process, the first authentication server 117 may check if it is within the validity period of the credential. In the case where it is determined that there is a risk that is lower than the criterion, the credential authentication process is omitted, and the load of the communication and the process is alleviated.

When the credential authentication is successful (S729), the first authentication server 117 transmits a credential authentication result message that indicates successful authentication to the application program A_103 (S731).

Then, the first authentication server 117 adds 1 to the counter value in the first authentication server 117 (S733). The first authentication server 117 further updates a credential authentication history (S735). At this time, the first authentication server 117 records the date and time when the credential authentication process is performed and the authentication result, for example.

The control unit 601 detects a success in the credential authentication (S737). The control unit 601 obtains the credential authentication result from the application program A_103, for example. Alternatively, the control unit 601 may capture a credential authentication result message. In the case where a success in the credential authentication is detected, the control unit 601 adds 1 to the counter value in the device 101 (S739). The control unit 601 further updates a credential authentication history (S741). At this time, the control unit 601 records the date and time when the credential authentication is received and the authentication result, for example. The process proceeds to the sequence illustrated in FIG. 7C.

The sequence in FIG. 7C will be described. Since the credential authentication is successful, the first authentication server 117 transmits an authentication result message that indicates successful authentication related to the sender to the second authorization server 125 (S761).

When the authentication result message which indicates successful authentication is received, the second authorization server 125 transmits an authorization result message that includes an access token for use of the application program X_109 to the application program A_103 (S763).

When the authorization result message is received, the application program A_103 extracts the access token from the authorization result message. Then, the application program A_103 transmits a request message that includes the access token to the application program X_109 (S765).

When the request message is received, the application program X_109 extracts the access token from the request message. Then, the application program X_109 transmits a verification request message for the access token to the second authorization server 125 (S767).

When the verification request message is received, the second authentication server 125 executes an access token verification process (S769). When the access token verification is successful (S771), the second authorization server 125 transmits a verification result message that indicates successful verification of the access token to the application program X_109 (S773).

When the verification result message which indicates successful verification of the access token is received, the application program X_109 performs a process that matches the content of the request message which is received in S765, and transmits a response message that includes the process result to the application program A_103 (S775).

FIGS. 8A to 8C illustrate an example of the sequence in the second access phase (S505). The application program Y_113 transmits an authorization request message related to use of the application program B_105 to the first authorization server 121 (S801).

When the authorization request message is received, the first authorization server 121 extracts a sender IP address and a sender program identifier from the authorization request message (S803). The first authorization server 121 transmits an authentication request message related to the sender to the second authentication server 129 (S805). The authentication request message includes the sender IP address and the sender program identifier. In this example, the first authorization server 121 does not perform a process related to a counter value, unlike the second authorization server 125.

The second authentication server 129 verifies a combination of the second information processing apparatus 111 and the application program Y_113 based on the sender IP address and the sender program identifier (S807). In the case where the combination of the second information processing apparatus 111 and the application program Y_113 is managed by the second authentication server 129, it is determined that the combination is valid (S809). In this example, the second authentication server 129 does not perform a process related to a counter value, unlike the first authentication server 117.

The second authentication server 129 executes a risk-based authentication process (S811). In this example, it is determined that there is a risk that is higher than a criterion (S813). The process proceeds to the sequence illustrated in FIG. 8B.

The sequence in FIG. 8B will be described. In the case where there is a risk that is higher than the criterion, the second authentication server 129 executes a credential authentication process (S821). At this time, the second authentication server 129 obtains a credential from the application program Y_113 (S823).

When the credential authentication is successful (S825), the second authentication server 129 transmits a credential authentication result message that indicates successful authentication to the application program Y_113 (S827).

The second authentication server 129 transmits an authentication result message that indicates successful authentication related to the sender (in this example, the application program Y_113 of the second information processing apparatus 111) of the authorization request message to the first authorization server 121 (S829).

When the authentication result message which indicates successful authentication is received, the first authorization server 121 transmits an authorization result message that includes an access token for use of the application program B_105 to the application program Y_113 (S831).

When the authorization result message is received, the application program Y_113 extracts the access token from the authorization result message. Then, the application program Y_113 transmits a request message that includes the access token to the application program B_105 (S833). The process proceeds to the sequence illustrated in FIG. 8C.

The sequence in FIG. 8C will be described. The application program B_105 transmits a verification request message for the access token to the first authorization server 121 (S841).

When the verification request message for the access token is received, the first authorization server 121 executes an access token verification process (S843). When the access token verification is successful (S845), the second authorization server 121 transmits a verification result message that indicates successful verification of the access token to the application program B_105 (S847).

When the verification result message which indicates successful verification of the access token is received, the application program B_105 performs a process that matches the content of the request message which is received in S833 in FIG. 8B, and transmits a response message that includes the process result to the application program Y_113 (S849).

The first authentication server 117 is not involved in the procedure discussed above. When communication with an external program performed in accordance with a procedure in which the first authentication server 117 is not involved is detected (S851), the control unit 601 adds 1 to the counter value in the device 101 (S853). The control unit 601 further updates a history of communication with the external program (S855). At this time, the control unit 601 records the date and time when the external communication is performed and the communication partner, for example.

Specifically, the control unit 601 detects communication with the external program in which the first authentication server 117 is not involved by obtaining a verification result message that indicates successful verification of the access token from the application program B_105, for example.

Alternatively, the control unit 601 may detect communication with the external program in which the first authentication server 117 is not involved by capturing a verification result message that indicates successful verification of the access token.

FIGS. 9A to 9D illustrate an example of the sequence in the third access phase (S507). The application program A_103 delivers an authorization request message to the control unit 601 at the stage when an authorization request message related to use of the application program X_109 is transmitted (S901).

When the authorization request message is received, the control unit 601 adds the counter value in the device 101 to the authorization request message (S903). At this stage, the counter value in the device 101 is 1. Then, the control unit 601 transmits the authorization request message to which the counter value in the device 101 has been added to the network (S905).

When the authorization request message is received, the second authorization server 125 extracts the counter value in the device 101, a sender IP address, and a sender program identifier from the authorization request message (S907). The second authorization server 125 transmits an authentication request message related to the sender to the first authentication server 117 (S909).

When the authentication request message is received, the first authentication server 117 reads the counter value which is stored in the first authentication server 117 (S911). In this example, the first authentication server 117 determines that the difference between the two counter values is a criterion or more (S913). In this example, for convenience of description, the criterion has a value of 1. However, the criterion may have a value of more than 1. The process proceeds to the sequence illustrated in FIG. 9B.

Figure 9B:
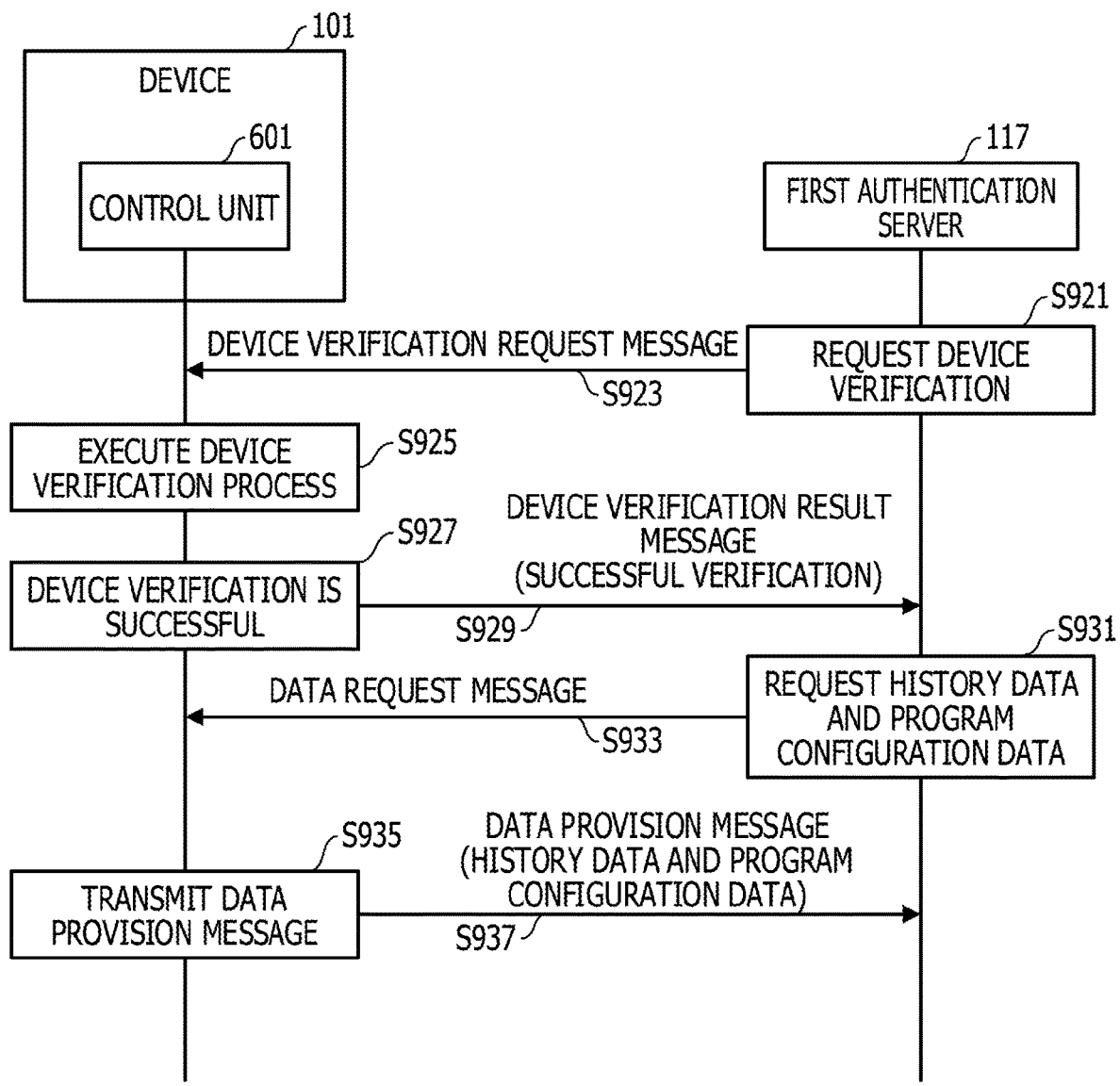
FIG. 9B illustrates an example of the sequence in the third access phase.

The sequence in FIG. 9B will be described. In the case where the difference between the two counter values is the criterion or more, the first authentication server 117 requests device verification (S921). At this time, the first authentication server 117 transmits a device verification request message to the control unit 601 (S923).

When the device verification request message is received, the control unit 601 executes a device verification process (S925). In the device verification process, the control unit 601 checks if the device 101 itself is normal. The control unit 601 performs a virus check by checking the state of the operating system, for example. When the device verification is successful (S927), the control unit 601 transmits a device verification result message that indicates successful verification to the first authentication server 117 (S929).

In the present embodiment, even in the case where the device verification is successful, external verification is further performed. Therefore, the first authentication server 117 requests the control unit 601 for history data and program configuration data (S931).

When a data request message transmitted in S933 is received, the control unit 601 transmits a data provision message (S935). The data provision message which is transmitted in S937 includes history data and program configuration data. The process proceeds to the sequence illustrated in FIG. 9C.

Figure 9C:
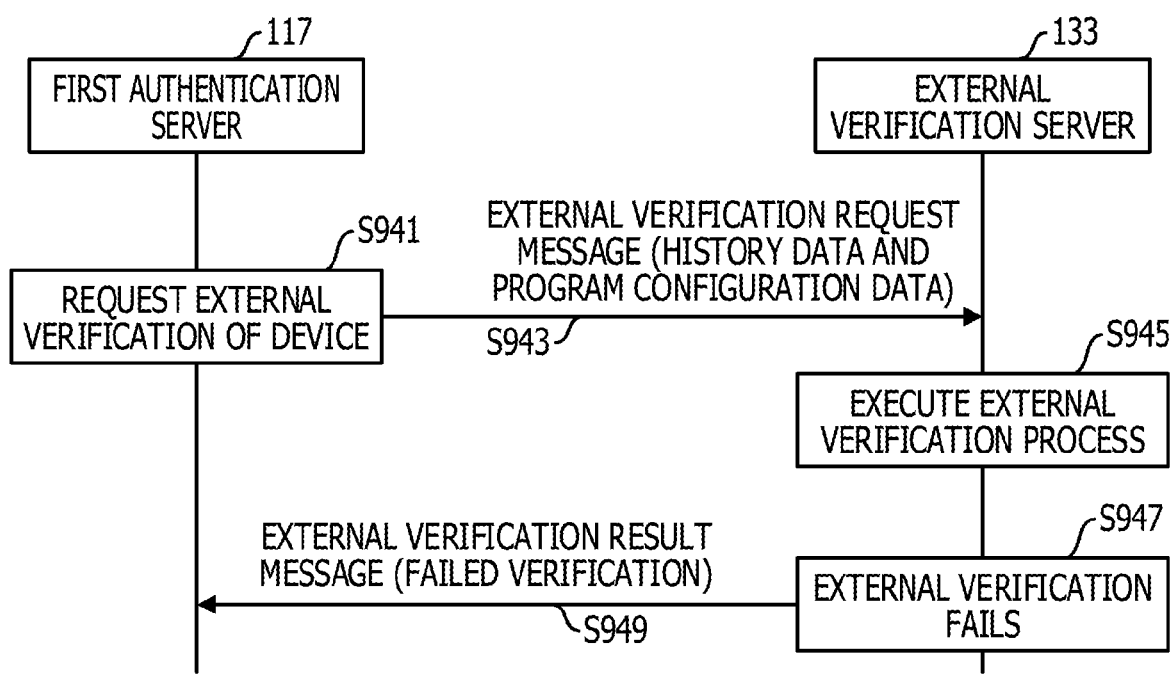
FIG. 9C illustrates an example of the sequence in the third access phase.

The sequence in FIG. 9C will be described. When the data provision message is received, the first authentication server 117 requests the external verification server 133 for external verification of the device 101 (S941). At this time, the first authentication server 117 transmits an external verification request message that includes the history data and the program configuration data to the external verification server 133 (S943).

When the external verification request message is received, the external verification server 133 executes an external verification process based on the history data and the program configuration data which are included in the external verification request message (S945). In the external verification process, the external verification server 133 searches for a trace of possible fraud (e.g. a program configuration corresponding to a falsification process for the device 101 or behavior of a program that indicates a characteristic of a fraudulent activity). Then, in the case where a trace of possible fraud is found, the external verification server 133 determines that the verification fails. If the external verification fails (S947), the external verification server 133 transmits an external verification result message that indicates failed verification to the first authentication server 117 (S949). The process proceeds to the sequence illustrated in FIG. 9D.

The sequence in FIG. 9D will be described. The first authentication server 117 transmits an authentication result message that indicates failed authentication related to the sender (in this example, the application program A_103 of the device 101) of the authorization request message to the second authorization server 125 (S961).

The first authentication server 117 registers the sender (in this example, the application program A_103 of the device 101) of the authorization request message in an invalid list (S963). The subsequent authentication fails for a combination of the device 101 and the application program which is registered in the invalid list. However, registration in the invalid list may be omitted. Then, the second authorization server 125 transmits an authorization result message that indicates denied access related to use of the application program X_109 to the application program A_103 (S965).

When the authorization result message which indicates denied access is received, the application program A_103 executes an error process (S967). Thus, the application program X_109 is not accessed.

Figure 10:
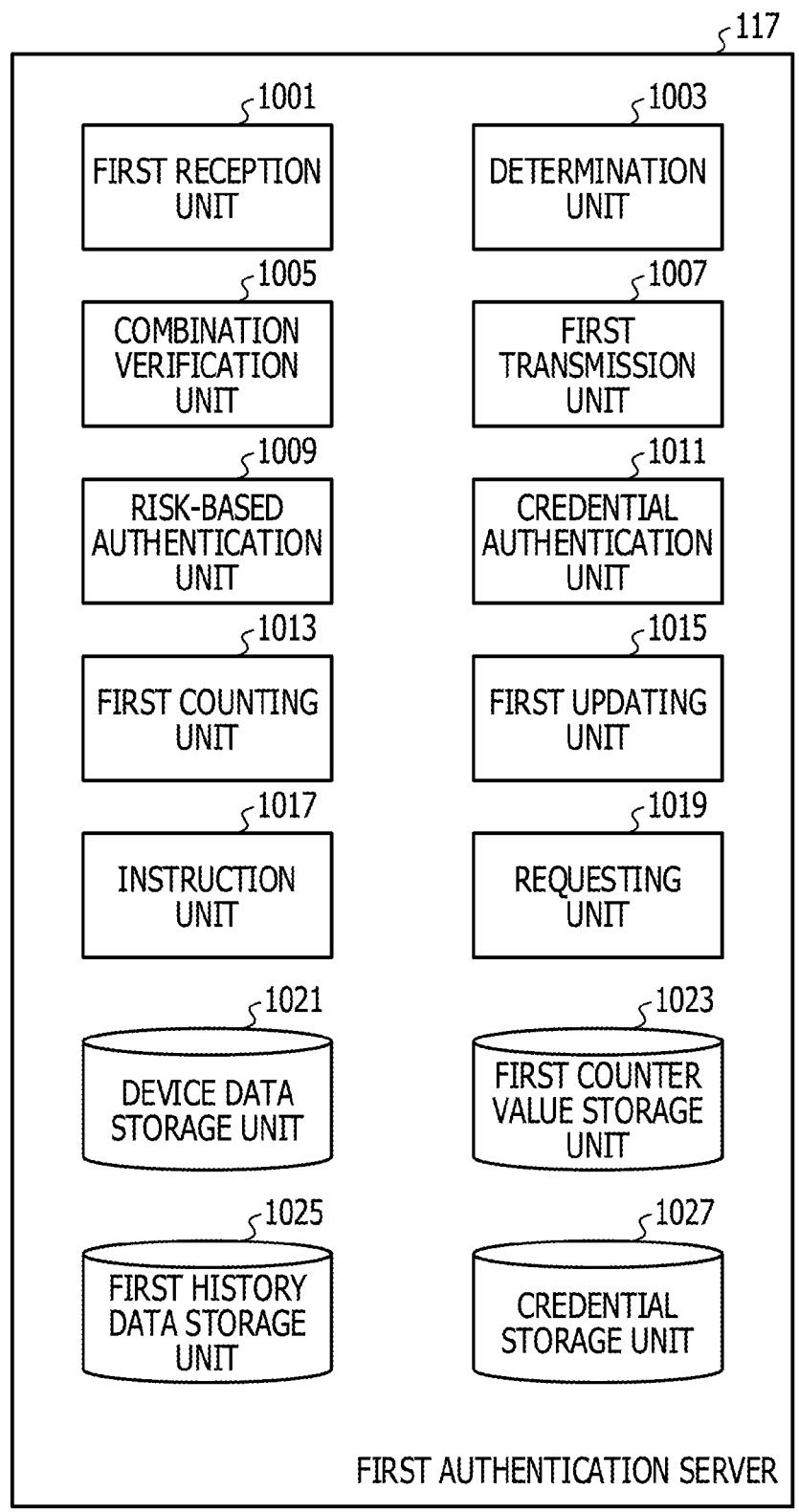
FIG. 10 illustrates an example of the module configuration of a first authentication server.

Subsequently, operation of the first authentication server 117 will be discussed in detail. FIG. 10 illustrates an example of the module configuration of the first authentication server 117. The first authentication server 117 includes a first reception unit 1001, a determination unit 1003, a combination verification unit 1005, a first transmission unit 1007, a risk-based authentication unit 1009, a credential authentication unit 1011, a first counting unit 1013, a first updating unit 1015, an instruction unit 1017, a requesting unit 1019, a device data storage unit 1021, a first counter value storage unit 1023, a first history data storage unit 1025, and a credential storage unit 1027.

The first reception unit 1001 receives various messages. The determination unit 1003 determines whether or not the difference between the counter value in the device 101 and the counter value in the first authentication server 117 is less than a criterion. The combination verification unit 1005 verifies a combination of a sender IP address and a sender program identifier in an authentication request message. The first transmission unit 1007 transmits various messages. The risk-based authentication unit 1009 executes a risk-based authentication process. The credential authentication unit 1011 executes a credential authentication process. The first counting unit 1013 adds 1 to the counter value in the first authentication server 117. The first updating unit 1015 updates a credential authentication history. The instruction unit 1017 instructs the control unit 601 of the device 101 for device verification. The requesting unit 1019 requests the external verification server 133 to verify the device 101.

The device data storage unit 1021 stores data related to the device 101 and a program that is included in the device 101 to be managed. The first counter value storage unit 1023 stores the counter value in the first authentication server 117. The first history data storage unit 1025 stores history data that include the credential authentication history. The credential storage unit 1027 stores a credential in a program that is included in the device 101.

Figure 11:
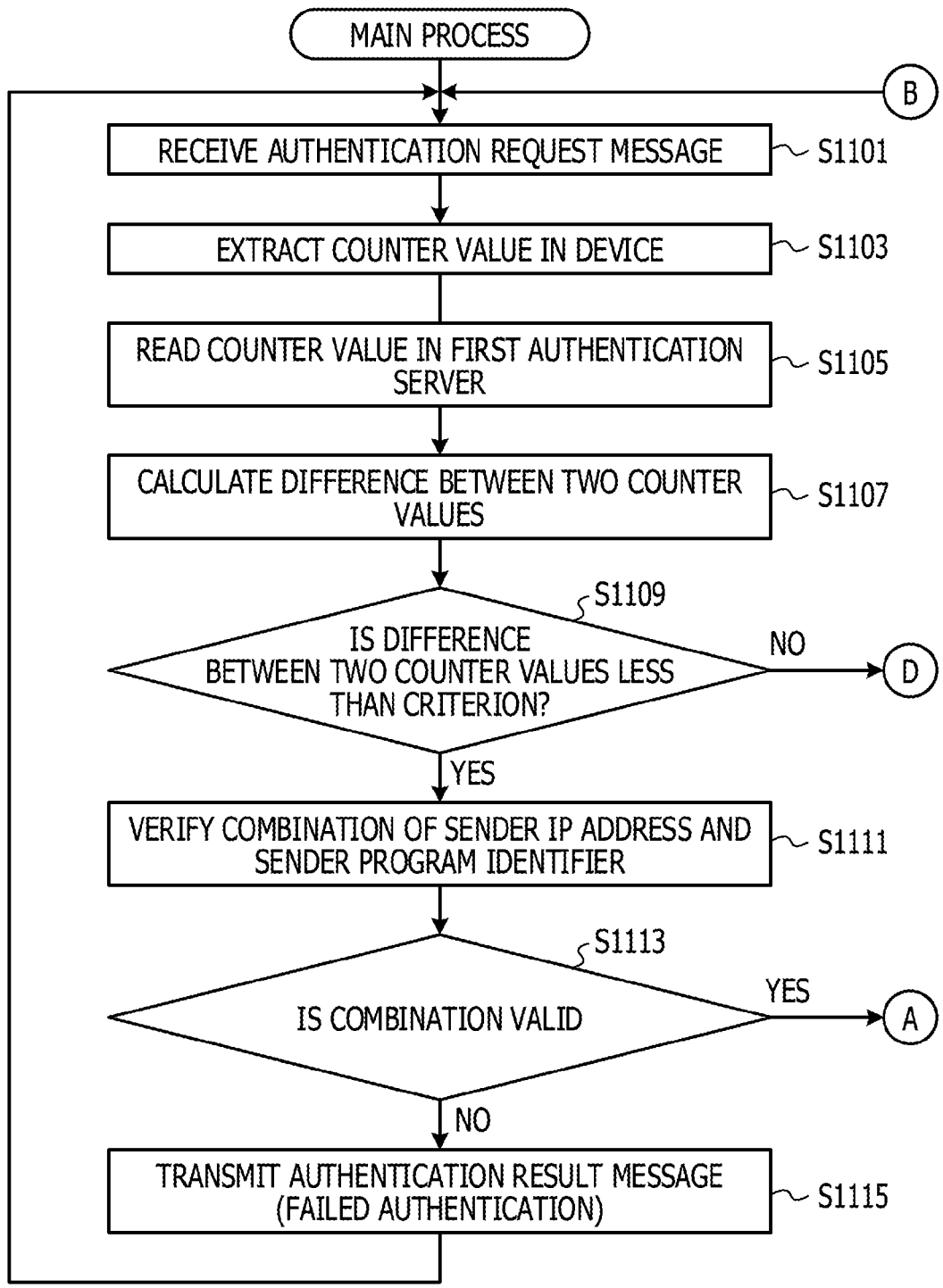
FIG. 11 illustrates a main process flow of the first authentication server.

FIG. 11 illustrates a main process flow of the first authentication server 117. When the first reception unit 1001 receives an authentication request message (S1101), the determination unit 1003 extracts a counter value in the device 101 from the authentication request message (S1103).

The determination unit 1003 reads the counter value in the first authentication server 117 (S1105), and the determination unit 1003 calculates the difference between the two counter values (S1107). Then, the determination unit 1003 determines whether or not the difference between the two counter values is less than a criterion (S1109).

In the case where it is determined that the difference between the two counter values is less than the criterion, the combination verification unit 1005 extracts the sender IP address and the sender program identifier from the authentication request message. Then, the combination verification unit 1005 verifies the combination of the sender IP address and the sender program identifier (S1111). In the case where the combination of the sender IP address and the sender program identifier is stored in the device data storage unit 1021, the combination verification unit 1005 determines that the combination is valid. In the case where the combination of the sender IP address and the sender program identifier is not stored in the device data storage unit 1021, on the other hand, the combination verification unit 1005 determines that the combination is not valid.

In the case where it is determined that the combination is not valid (S1113), the first transmission unit 1007 transmits an authentication result message that indicates failed authentication to the sender of the authentication request message (S1115). Then, the process returns to the process indicated in S1101, and repeats the processes discussed above. In the case where it is determined that the combination is valid (S1113), on the other hand, the process proceeds to the process in S1201 illustrated in FIG. 12 via a terminal A.

Figure 12:
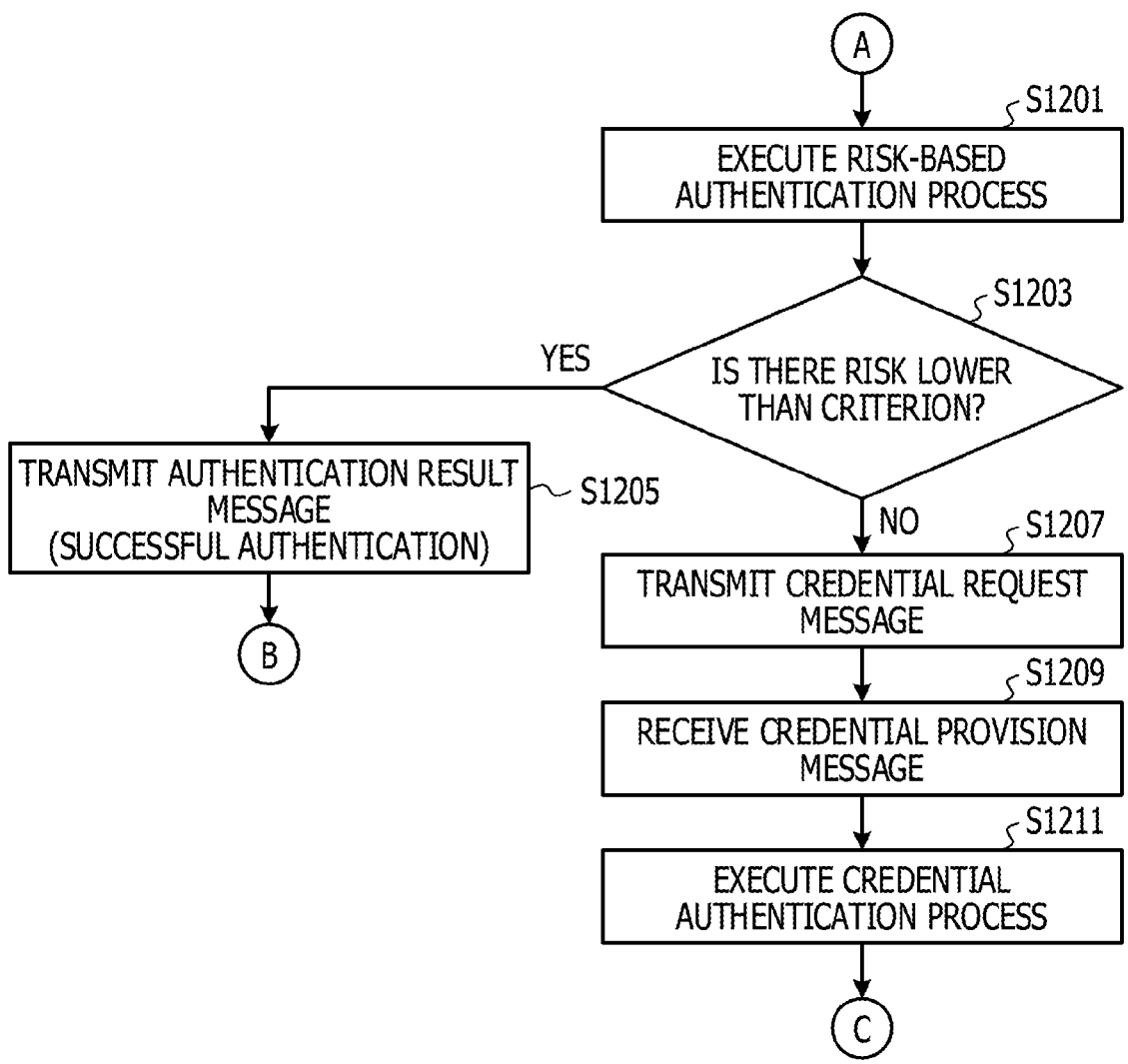
FIG. 12 illustrates the main process flow of the first authentication server.

FIG. 12 will be described. The risk-based authentication unit 1009 executes a risk-based authentication process related to a program that is specified in accordance with the combination of the sender IP address and the sender program identifier which are extracted from the authentication request message (S1201), and determines whether or not there is a risk that is lower than a criterion (S1203).

In the case where it is determined that there is a risk that is lower than the criterion, the first transmission unit 1007 transmits an authentication result message that indicates successful authentication to the sender of the authentication request message (S1205). Then, the process returns to the process in S1101 illustrated in FIG. 11 via a terminal B.

In the case where it is determined that there is a risk that is not less than the criterion, on the other hand, the credential authentication unit 1011 transmits a credential request message to a program that is specified in accordance with the combination of the sender IP address and the sender program identifier which are extracted from the authentication request message (S1207).

After that, the credential authentication unit 1011 receives a credential provision message (S1209). The credential authentication unit 1011 extracts a credential from the credential provision message, and executes a credential authentication process based on the extracted credential (S1211). The process proceeds to the process in S1301 illustrated in FIG. 13 via a terminal C.

Figure 13:
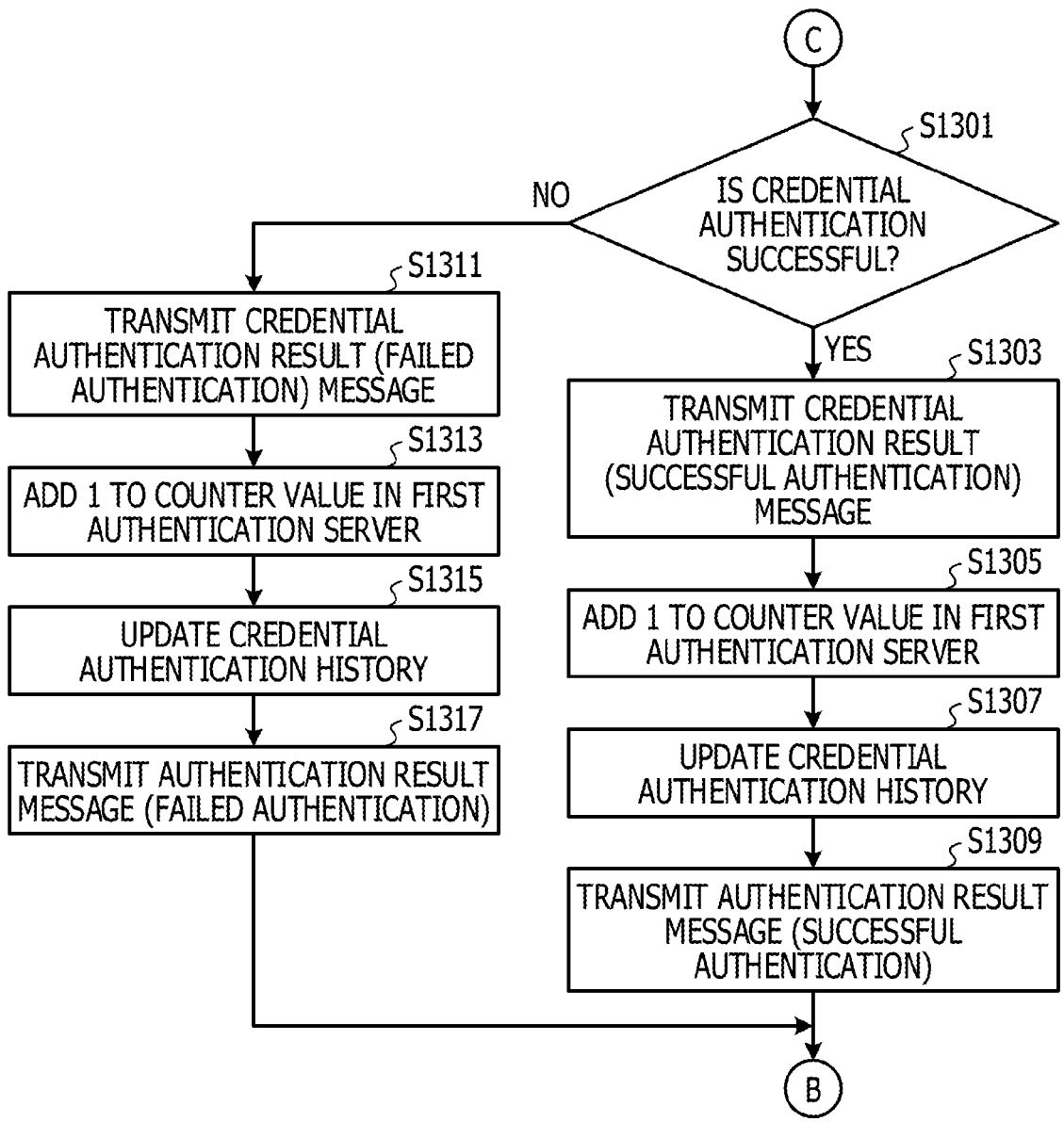
FIG. 13 illustrates the main process flow of the first authentication server.

FIG. 13 will be described. The process is branched in accordance with whether or not the credential authentication is successful (S1301). In the case where the credential authentication is successful, the first transmission unit 1007 transmits a credential authentication result message that indicates successful authentication to a program that is specified in accordance with the combination of the sender IP address and the sender program identifier which are extracted from the authentication request message (S1303).

The first counting unit 1013 adds 1 to the counter value in the first authentication server 117 (S1305). The first updating unit 1015 updates a credential authentication history (S1307). Then, the first transmission unit 1007 transmits an authentication result message that indicates successful authentication to the sender of the authentication request message (S1309).

In the case where the credential authentication fails, the first transmission unit 1007 transmits a credential authentication result message that indicates failed authentication to a program that is specified in accordance with the combination of the sender IP address and the sender program identifier which are extracted from the authentication request message (S1311).

The first counting unit 1013 adds 1 to the counter value in the first authentication server 117 (S1313). The first updating unit 1015 updates a credential authentication history (S1315). Then, the first transmission unit 1007 transmits an authentication result message that indicates failed authentication to the sender of the authentication request message (S1317). Then, the process returns to the process in S1101 illustrated in FIG. 11 via the terminal B.

Figure 14:
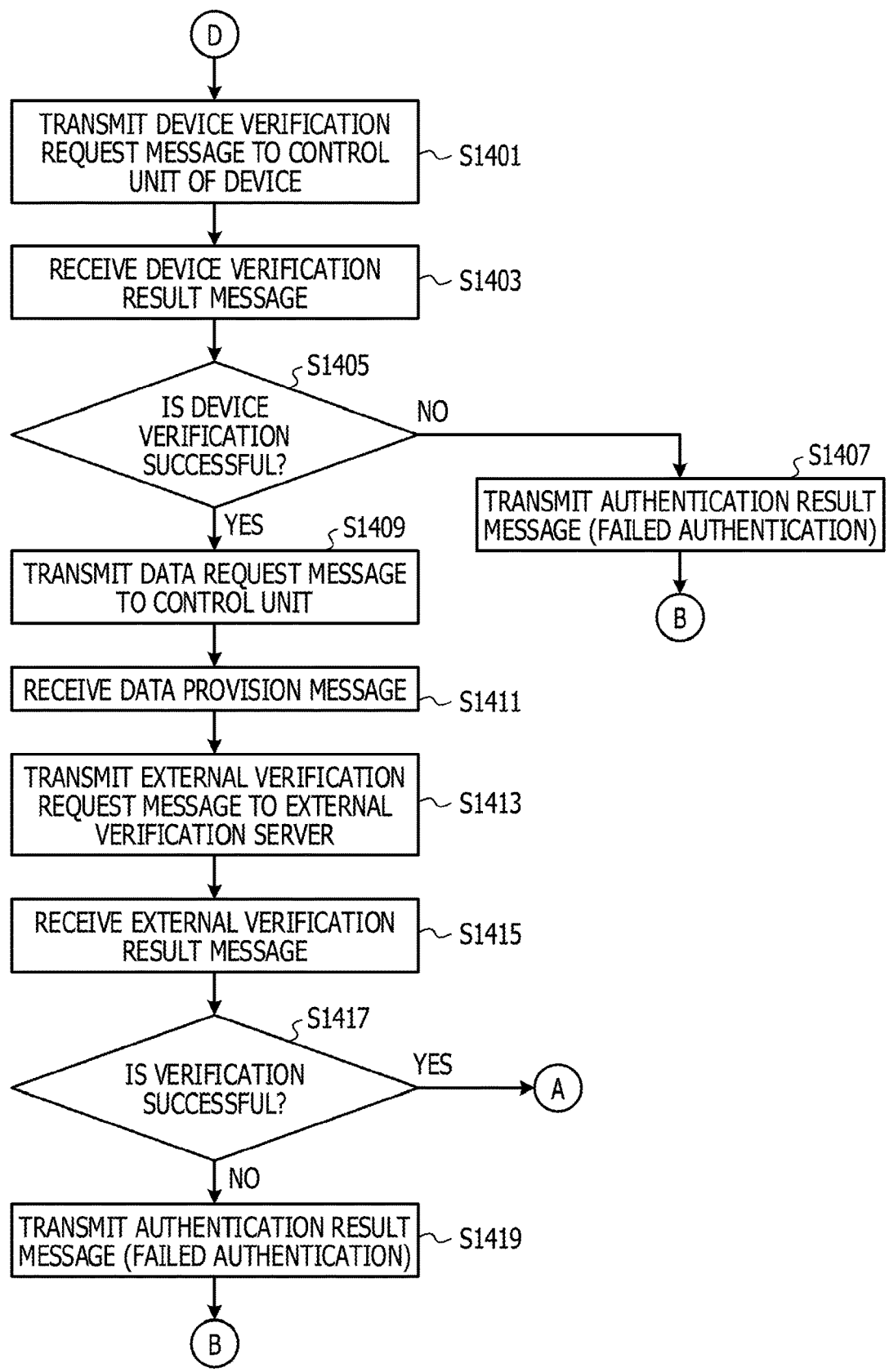
FIG. 14 illustrates the main process flow of the first authentication server.

Returning to the description of FIG. 11, in the case where it is determined in S1109 that the difference between the two counter values is not less than the criterion, the process proceeds to the process in S1401 illustrated in FIG. 14 via a terminal D.

FIG. 14 will be described. The instruction unit 1017 transmits a device verification request message to the control unit 601 (S1401), and thereafter receives a device verification result message from the control unit 601 (S1403).

The process is branched in accordance with whether or not the device verification is successful (S1405). In the case where the device verification fails, the requesting unit 1019 transmits an authentication result message that indicates failed authentication to the sender of the authentication request message (S1407). Then, the process returns to the process in S1101 illustrated in FIG. 11 via the terminal B.

In the case where the device verification is successful, on the other hand, the requesting unit 1019 transmits a data request message to the control unit 601 of the device 101 (S1409).

After that, the requesting unit 1019 receives a data provision message (S1411). The requesting unit 1019 extracts history data and program configuration data from the data provision message. Then, the requesting unit 1019 transmits an external verification request message that includes the history data and the program configuration data which are extracted to the external verification server 133 (S1413).

After that, the requesting unit 1019 receives the external verification result message from the external verification server 133 (S1415). The process is branched in accordance with the external verification result (S1417). In the case where the external verification result indicates successful verification, the process proceeds to the process in S1201 illustrated in FIG. 12 via the terminal A.

In the case where the external verification result indicates failed verification, on the other hand, the first transmission unit 1007 transmits an authentication result message that indicates failed authentication to the sender of the authentication request message (S1419). Then, the process returns to the process in S1101 illustrated in FIG. 11 via the terminal B.

Figure 15:
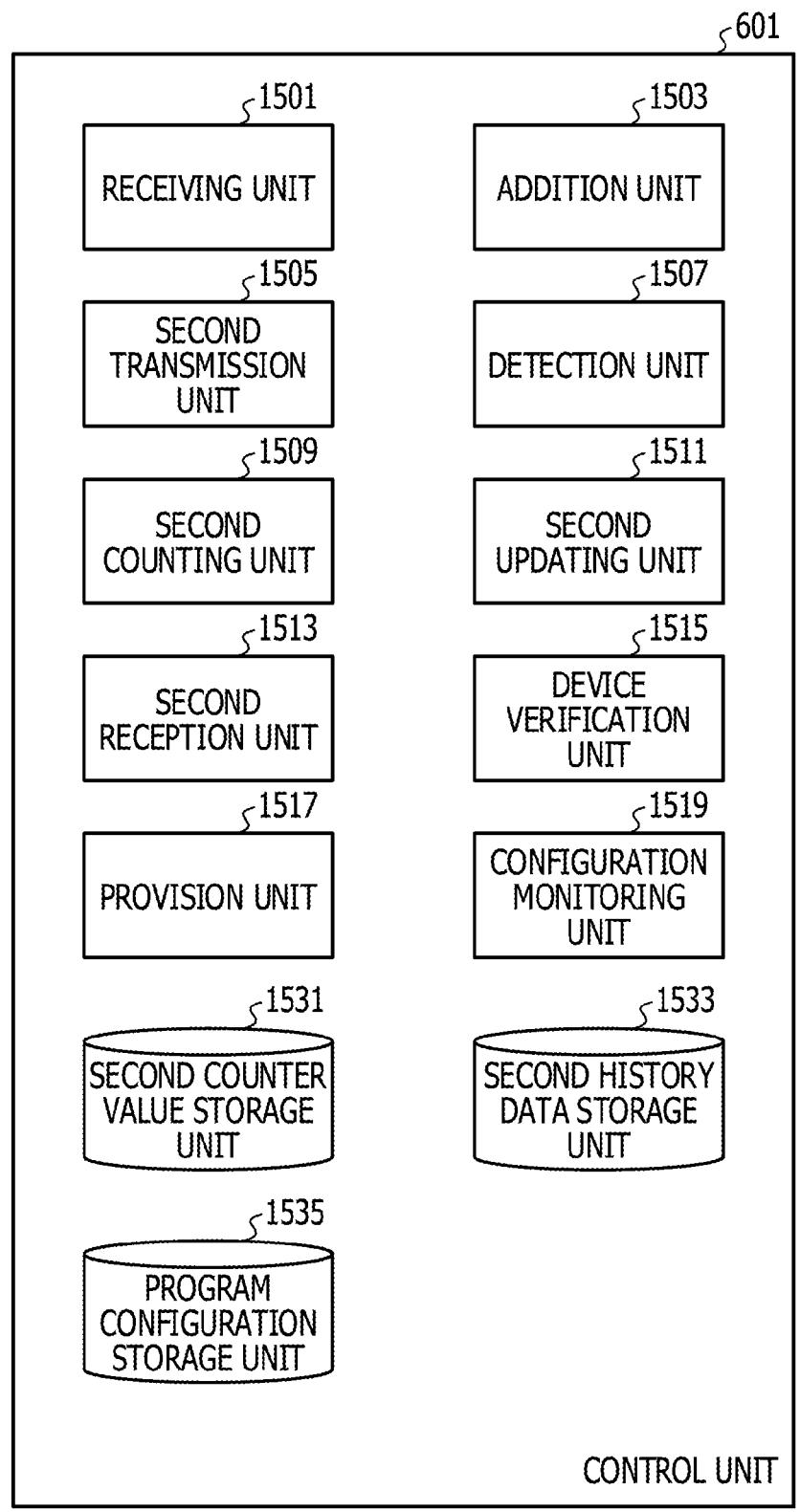
FIG. 15 illustrates an example of the module configuration of a control unit.

Subsequently, operation of the control unit 601 will be discussed in detail. FIG. 15 illustrates an example of the module configuration of the control unit 601. The control unit 601 includes a receiving unit 1501, an addition unit 1503, a second transmission unit 1505, a detection unit 1507, a second counting unit 1509, a second updating unit 1511, a second reception unit 1513, a device verification unit 1515, a provision unit 1517, a configuration monitoring unit 1519, a second counter value storage unit 1531, a second history data storage unit 1533, and a program configuration storage unit 1535.

The receiving unit 1501 receives an authorization request message. The addition unit 1503 adds the counter value in the device 101 to the authorization request message. The second transmission unit 1505 transmits various messages. The detection unit 1507 detects various events. The second counting unit 1509 adds 1 to the counter value in the device 101. The second updating unit 1511 updates a credential authentication history. The second reception unit 1513 receives various messages. The device verification unit 1515 executes a device verification process. The provision unit 1517 transmits a data provision message that includes history data and program configuration data. The configuration monitoring unit 1519 monitors a change in the program configuration, and writes the content of the change into the program configuration data in the case where the program configuration has been changed.

The second counter value storage unit 1531 stores the counter value in the device 101. In this example, the second counter value storage unit 1531 is provided in the tamper-resistant memory 407. The second history data storage unit 1533 stores history data that include the credential authentication history and a history of communication with an external program. The program configuration storage unit 1535 stores the program configuration data.

The receiving unit 1501, the addition unit 1503, the second transmission unit 1505, the detection unit 1507, the second counting unit 1509, the second updating unit 1511, the second reception unit 1513, the device verification unit 1515, the provision unit 1517, and the configuration monitoring unit 1519 discussed above are implemented using a hardware resource (e.g. FIG. 3 or FIG. 18) and a program that causes the program 303 or a central processing unit (CPU) 2503 to execute the process discussed below.

The second counter value storage unit 1531, the second history data storage unit 1533, and the program configuration storage unit 1535 discussed above are implemented using a hardware resource (e.g. FIG. 3 or FIG. 18).

Figure 16:
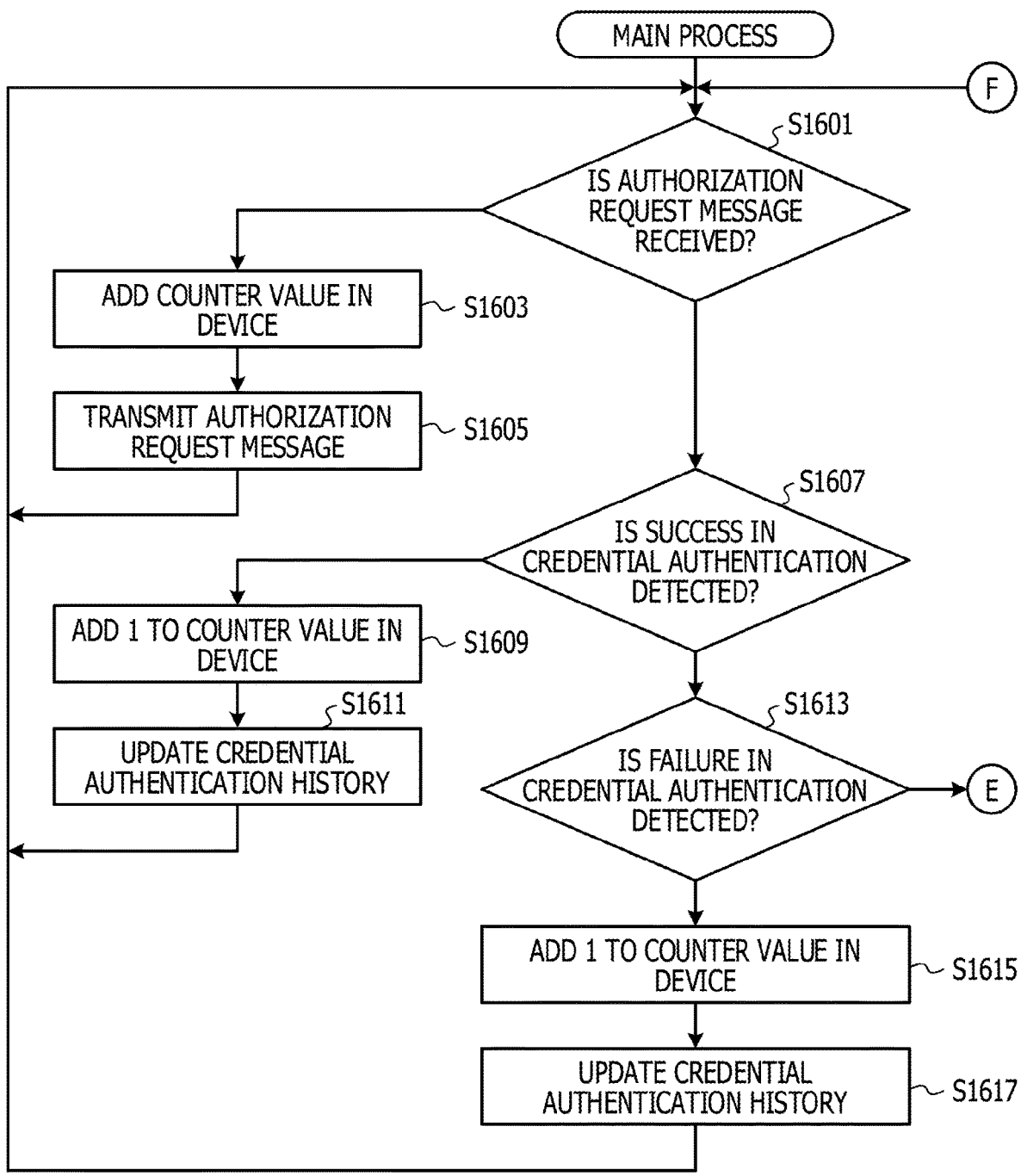
FIG. 16 illustrates a main process flow of the control unit.

FIG. 16 illustrates a main process flow of the control unit 601. When the receiving unit 1501 receives an authorization request message from a program in the device 101 (S1601), the addition unit 1503 adds the counter value in the device 101 to the authorization request message (S1603). Then, the second transmission unit 1505 transmits the authorization request message to which the counter value in the device 101 has been added (S1605). Then, the process returns to the process indicated in S1601, and repeats the processes discussed above.

In the case where an authorization request message is not received from a program in the device 101, on the other hand, the detection unit 1507 determines whether or not a success in the credential authentication is detected (S1607). In the case where a success in the credential authentication is detected, the second counting unit 1509 adds 1 to the counter value in the device 101 (S1609). The second updating unit 1511 updates a credential authentication history (S1611). Then, the process returns to the process indicated in S1601, and repeats the processes discussed above.

In the case where a success in the credential authentication is not detected, on the other hand, the detection unit 1507 determines whether or not a failure in the credential authentication is detected (S1613). In the case where a failure in the credential authentication is detected, the second counting unit 1509 adds 1 to the counter value in the device 101 (S1615). The second updating unit 1511 updates a credential authentication history (S1617). Then, the process returns to the process indicated in S1601, and repeats the processes discussed above.

Figure 17:
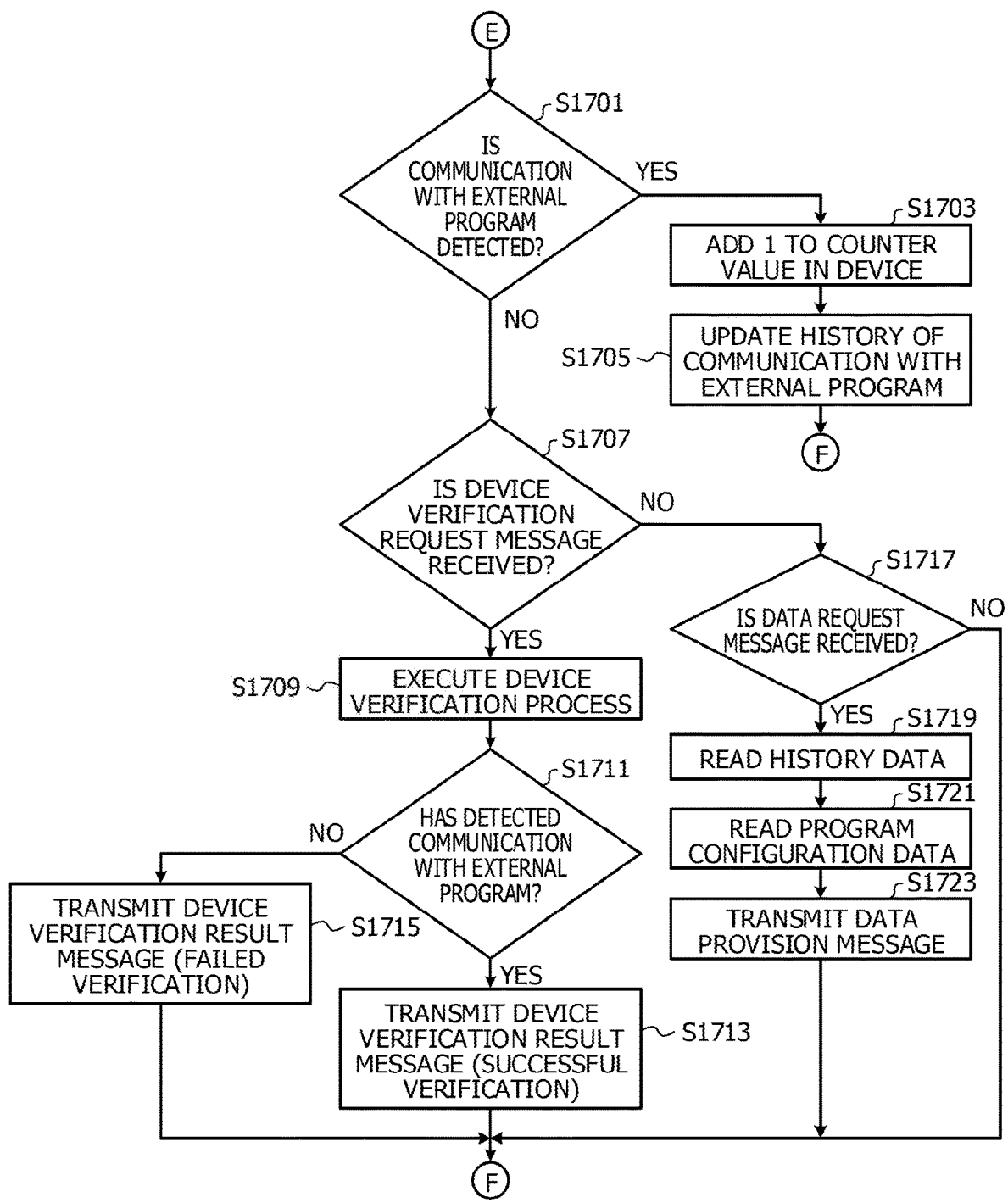
FIG. 17 illustrates the main process flow of the control unit.

In the case where a failure in the credential authentication is not detected, on the other hand, the process proceeds to the process in S1701 illustrated in FIG. 17 via a terminal E.

FIG. 17 will be described. The detection unit 1507 determines whether or not communication with an external program is detected (S1701) as described in relation to S851 in FIG. 8. In the case where communication with an external program is detected, the second counting unit 1509 adds 1 to the counter value in the device 101 (S1703). The second updating unit 1511 updates a history of communication with the external program (S1705). Then, the process returns to the process indicated in S1601 via a terminal F, and repeats the processes discussed above.

In the case where communication with an external program is not detected, on the other hand, the process is branched in accordance with whether or not the second reception unit 1513 receives a device verification request message (S1707). When the second reception unit 1513 receives a device verification request message, the device verification unit 1515 executes a device verification process (S1709).

The process is branched in accordance with whether or not the device verification is successful (S1711). In the case where the device verification is successful, the second transmission unit 1505 transmits a device verification result message that indicates successful verification to the sender of the device verification request message (S1713). Then, the process returns to the process in S1601 illustrated in FIG. 16 via the terminal F.

In the case where the device verification fails, on the other hand, the second transmission unit 1505 transmits a device verification result message that indicates failed verification to the sender of the device verification request message (S1715). Then, the process returns to the process in S1601 illustrated in FIG. 16 via the terminal F.

Returning to the description of the process in S1707, in the case where the second reception unit 1513 does not receive a device verification request message, the process is branched in accordance with whether or not the second reception unit 1513 receives a data request message (S1717).

In the case where the second reception unit 1513 receives a data request message, the provision unit 1517 reads history data from the second history data storage unit 1533 (S1719), and further reads program configuration data from the program configuration storage unit 1535 (S1721). The provision unit 1517 transmits a data provision message that includes the history data and the program configuration data to the sender of the data request message (S1723). Then, the process returns to the process in S1601 illustrated in FIG. 16 via the terminal F.

In the case where the second reception unit 1513 does not receive a data request message, on the other hand, the process directly returns to the process in S1601 illustrated in FIG. 16 via the terminal F.

In S1107 in FIG. 11, the determination unit 1003 may calculate the ratio between the two counter values. The determination unit 1003 calculates the ratio of the counter value in the first authentication server 117 to the counter value in the device 101, for example. In S1109 in FIG. 11, the determination unit 1003 may determine whether or not the ratio between the two counter values is less than a criterion. In the case where it is determined that the ratio between the two counter values is less than the criterion, the process proceeds to S1111. In the case where it is determined that the ratio between the two counter values is not less than the criterion, on the other hand, the process proceeds to the process in S1401 in FIG. 14 via the terminal D.

The predetermined operation in the device 101 may not include operation of communication performed with an external program in accordance with a procedure not via the first authentication server 117. In that case, the process in S1703 illustrated in FIG. 17 may be omitted.

According to the present embodiment, a risk with the device 101 may be estimated. An increase in the risk with the device 101 due to a process performed by the device 101 without involvement of the first authentication server 117 may be determined.

The difference between the two counter values becomes large in the case where false credential authentication with spoofing for the first authentication server 117 is performed, which makes it easy to recognize a risk due to the spoofing for the first authentication server 117.

This makes it easy to recognize an increase in the risk due to external communication.

Use of external verification serves to enhance the precision of device verification.

While an embodiment of the present disclosure has been described above, the present disclosure is not limited thereto. For example, the functional block configuration discussed above occasionally does not coincide with the program module configuration.

The configuration of the storage regions described above is exemplary, and is not limiting. Further, in the process flow, the order of processes may be changed, or a plurality of processes may be executed concurrently with each other, unless the process result is changed.

The server apparatus 115 discussed above is a computer apparatus, to which a memory 2501, the CPU 2503, a hard disk drive (HDD) 2505, a display control unit 2507 connected to a display apparatus 2509, a drive apparatus 2513 for a removable disk 2511, an input apparatus 2515, and a communication control unit 2517 for connection to a network are connected through a bus 2519 as illustrated in FIG. 18. An operating system and application programs for performing processes in the present embodiment are stored in the HDD 2505, and read from the HDD 2505 into the memory 2501 to be executed by the CPU 2503. The CPU 2503 controls the display control unit 2507, the communication control unit 2517, and the drive apparatus 2513 in accordance with the process content of an application program to cause such components to perform predetermined operation. Data being processed are mainly stored in the memory 2501, and may be stored in the HDD 2505. In the embodiment of the present disclosure, the application programs for performing the processes discussed above are distributed as stored in the removable disk 2511 which is computer-readable, and installed onto the HDD 2505 from the drive apparatus 2513. The application programs are occasionally installed onto the HDD 2505 by way of a network such as the Internet and the communication control unit 2517. Such a computer apparatus implements the various functions discussed above through organic cooperation between hardware such as the memory 2501 and programs such as the OS and the application programs.

The embodiment of the present disclosure discussed above is summarized as follows.

The present embodiment provides a determination method executed by a computer that serves as an authentication apparatus for a program that operates on a device, the determination method including: (A) counting a number of times of execution of a first process related to the device; and (B) determining, in a case where an authentication request for the program that includes a number of times of execution of a second process in the device is received, whether or not it is required to verify the device based on a result of comparison between the number of times of execution of the first process and the number of times of execution of the second process.

This makes it possible to estimate a risk with a device to be authenticated.

The first process may be a credential authentication process for the program. The second process may be a process of detecting reception of a result of the credential authentication process by the authentication apparatus.

This makes it easy to recognize a risk due to spoofing for the authentication apparatus.

The determination method may further include (C) adding a number of times of a process of communication with an external program performed in accordance with a procedure in which the authentication apparatus is not involved to the number of times of execution of the second process.

This makes it easy to recognize an increase in the risk due to external communication.

The determination method may further include (D) requesting an external verification apparatus for the verification in the case where it is determined that the verification is required.

This serves to enhance the precision of device verification.

It is possible to prepare a program that causes a computer to perform the processes according to the method described above. The program may be stored in a computer-readable storage medium or a storage apparatus such as a flexible disk, a CD-ROM, a magneto-optical disk, a semiconductor memory, and a hard disk, for example. In general, intermediate process results are temporarily stored in a storage apparatus such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determination method executed by a computer that serves as an authentication apparatus for a program that operates on a device, the determination method comprising:
    counting a number of times of execution of a first process related to the device, the first process being a credential authentication process for the program;
    determining whether or not a verification is required by another device based on a result of comparison between the number of times of execution of the first process and a number of times of execution of a second process which is a process of detecting reception of a result of the credential authentication process by the authentication apparatus, the number of times of execution of the second process being included in an authentication request which is received;
    verifying, when the verification is not required by the another device, whether or not a set of the device and the program is valid; and
    transmitting, when the verification is required by the another device, a message for requesting the verification to the device,
    adding a number of times of a process of communication with an external program performed in accordance with a procedure in which the authentication apparatus is not involved to the number of times of execution of the second process.

2. The determination method according to claim 1, further comprising:
    acquiring a difference value between the number of times of execution of the first process and the number of times of execution of the second process, wherein
    the determining includes determining whether or not the verification is required based on the difference value.

3. The determination method according to claim 2, wherein
    the determining includes determining that the verification is required, when the different value is greater than a threshold value.

4. The determination method according to claim 1, further comprising:
    specifying, when the set is valid, a risk for the program that is specified by the set, and
    transmitting, when the set is not valid, a message indicating a verification failure.

5. An authentication apparatus for a program that operates on a device, the authentication apparatus comprising:
    a memory; and
    a processor coupled to the memory and configured to
    count a number of times of execution of a first process related to the device, the first process being a credential authentication process for the program; and
    determine whether or not a verification is required by another device based on a result of comparison between the number of times of execution of the first process and a number of times of execution of a second process which is a process of detecting reception of a result of the credential authentication process by the authentication apparatus, the number of times of execution of the second process being included in an authentication request which is received,
    verify, when the verification is not required by the another device, whether or not a set of the device and the program, and transmit, when the verification is required by the another device, a message for requesting the verification to the device, add a number of times of a process of communication with an external program performed in accordance with a procedure in which the authentication apparatus is not involved to the number of times of execution of the second process.

6. A non-transitory computer-readable storage medium storing a program that causes a processor included in an authentication apparatus to execute a process, the process comprising:

counting a number of times of execution of a first process related to the device, the first process being a credential authentication process for the program; and determining whether or not a verification is required by another device based on a result of comparison between the number of times of execution of the first process and a number of times of execution of a second process which is a process of detecting reception of a result of the credential authentication process by the authentication apparatus, the number of times of execution of the second process being included in an authentication request which is received;

verifying, when the verification is not required by the another device, whether or not a set of the device and the program; and transmitting, when the verification is required by the another device, a message for requesting the verification to the device, add a number of times of a process of communication with an external program performed in accordance with a procedure in which the authentication apparatus is not involved to the number of times of execution of the second process.

\* \* \* \* \*